United States Patent
Akimoto et al.

(10) Patent No.: US 8,683,673 B2
(45) Date of Patent: Apr. 1, 2014

(54) METHOD FOR MANUFACTURING STATORS FOR ROTARY ELECTRIC MACHINES

(75) Inventors: Akito Akimoto, Kariya (JP); Keigo Moriguchi, Takahama (JP); Seiji Hayashi, Nagoya (JP)

(73) Assignee: Denso Corporation, Kariya (JP)

( * ) Notice: Subject to any disclaimer, the term of this patent is extended or adjusted under 35 U.S.C. 154(b) by 107 days.

(21) Appl. No.: 12/498,595

(22) Filed: Jul. 7, 2009

(65) Prior Publication Data
US 2010/0000075 A1    Jan. 7, 2010

(30) Foreign Application Priority Data
Jul. 7, 2008   (JP) .................... 2008-177304

(51) Int. Cl.
*H02K 15/04*    (2006.01)
(52) U.S. Cl.
USPC ............................... 29/596; 310/89
(58) Field of Classification Search
USPC .......... 29/596–598, 732–734; 310/51, 89, 91, 310/216.125, 216.121
See application file for complete search history.

(56) References Cited

U.S. PATENT DOCUMENTS

| | | | | |
|---|---|---|---|---|
| 4,297,784 A | * | 11/1981 | Vagman | 29/596 |
| 4,466,182 A | * | 8/1984 | Lamatsch et al. | 29/596 |
| 4,499,391 A | * | 2/1985 | Sakamoto | 310/89 |
| 7,340,820 B2 | * | 3/2008 | Kliman et al. | 29/596 |
| 7,363,696 B2 | * | 4/2008 | Kimura et al. | 29/596 |
| 8,397,368 B2 | * | 3/2013 | Akimoto et al. | 29/596 |

FOREIGN PATENT DOCUMENTS

| | | |
|---|---|---|
| JP | H06-86511 | 3/1994 |
| JP | H11-147141 | 6/1999 |
| JP | H11-341748 | 12/1999 |
| JP | P2000-341889 A | 12/2000 |
| JP | 2003-264964 | 9/2003 |
| JP | 2004-343885 | 12/2004 |

OTHER PUBLICATIONS

Japanese Office Action (2 pages) dated Nov. 14, 2012, issued in corresponding Application No. 2008-177304 with at least partial English translation (1 page).

* cited by examiner

*Primary Examiner* — Minh Trinh
(74) *Attorney, Agent, or Firm* — Nixon & Vanderhye PC

(57) ABSTRACT

A method is provided, for manufacturing a stator for a rotary electric machine by shrink-fitting an outer cylinder to a core assembly where a cage-shaped wound coil is assembled with segment cores. The assembly is inserted into the outer cylinder having a diameter increased by thermal expansion caused by the heat from a heating unit, while the outer diameter of the assembly is being reduced by permitting the assembly to pass through a tapered guide unit. The guide unit has a portion whose diameter is larger than an outer diameter of the assembly, and a portion whose diameter is larger than an inner diameter of the outer cylinder and smaller than an inner diameter of the cylinder in the thermally expanded state, and a tapered through hole vertically passing through the guide unit. Thus, the size of the assembly is radially reduced, with a uniform diameter being obtained throughout the assembly.

2 Claims, 22 Drawing Sheets

(INCREASED TO INNER DIAMETER C' WHEN HEATED)

METHOD FOR MANUFACTURING STATORS FOR ROTARY ELECTRIC MACHINES

CROSS-REFERENCE TO RELATED APPLICATION

This application is based on and claims the benefit of priority from earlier Japanese Patent Application No. 2008-177304 filed Jul. 7, 2008, the description of which is incorporated herein by reference.

BACKGROUND OF THE INVENTION

1. Field of the Invention

The present invention relates to a stator manufacturing apparatus and a stator manufacturing method for rotary electric machines, and in particular, to a stator manufacturing apparatus and a stator manufacturing method for rotary electric machines, with which the segment cores of a stator to be manufactured are shrink-fitted to an outer cylinder, in manufacturing the stator for a rotary electric machine.

2. Description of the Related Art

In recent years, small size, high power and high quality have been demanded of rotary electric machines used as electric motors and electric generators. Taking rotary electric machines loaded on vehicles as an example, the space for loading such a rotary electric machine has been reduced more and more, while the output has been required to be more enhanced.

Rotary electric machines that have been known include one which is provided with a stator having a stator coil formed of continuous windings, as disclosed in Japanese Patent No. 3894004. In the stator of such a rotary electric machine, twelve wires are used to form a three-phase winding of the stator coil. Accordingly, the stator has a structure in which twenty-four wire ends are axially projected from an axial end face of the stator core. Therefore, this type of stator requires a large space outside the axial end face of the stator core, so that the wire ends can be connected with each other. This however has raised a problem of increasing the axial dimension of stators.

To counter this problem, it has been considered to suppress the size of a stator by reducing the size of the stator coil.

Meanwhile, as an example of a method for manufacturing stators consisting of continuous windings, the following method has been known. In the method, a plurality of shaped wires are produced, first, from electrically conductive wires in each of which a plurality of straight portions are juxtaposed being connected with each other via turn portions. Then, these shaped wires are integrated to form an integrated body. In the integrated body, one shaped wire is paired with another shaped wire, and a plurality of such shaped-wire pairs are juxtaposed in the longitudinal direction of the integrated body. In each of the shaped-wire pairs composing the integrated body, the plurality of straight portions of one shaped wire are superposed on the respective plurality of straight portions of the other shaped wire to form a plurality of straight superposition portions in the longitudinal direction of the integrated body.

In this way, the plurality of straight superposition portions are juxtaposed in the longitudinal direction of the integrated body. The integrated body is then wound about a core member with a predetermined number of turns to thereby form a wound body. In the wound body, the plurality of straight superposition portions in each shaped-wire pair are radially stacked to form a plurality of straight stack portions in the circumferential direction. The wound body obtained in this way is used as a cylindrical cage-shaped stator coil. In assembling this stator coil into a stator core, each of the straight stack portions are disposed in respective slots of the stator core, while the turn portions are disposed outside the slots.

However, it is quite difficult to assemble such a cylindrical cage-shaped stator coil into an integral type stator core already having a shape of a core. To counter this, segment cores are used, each having a shape resulting from circumferentially dividing an annular core into a plurality of pieces. Use of such segment cores permits the segment cores to be individually assembled into the cylindrical cage-shaped stator coil from outside, and then to fit the entirety into an outer cylinder, for manufacturing a stator. The fitting into the outer cylinder is performed by using a so-called shrinkage fitting method.

In performing the shrinkage fitting, the stator core, in which a plurality of segment cores are circumferentially disposed, is required to be evenly shrunk in the radial direction from the side of the outer circumference. Otherwise, the stator core will be distorted and thus the circularity (e.g., 0.05 mm) required for a rotary electric machine cannot be ensured. Since the stator core in fact has been divided along the circumference, it is difficult to evenly shrink the stator core. Thus, segment cores have created a problem of difficulty in achieving shrinkage fitting with a uniform diameter throughout the stator core.

SUMMARY OF THE INVENTION

The present invention has been made in light of the circumstances described above, and has as its object to provide a resolution for easily and evenly performing radial shrinkage of a stator core in which segment cores are disposed along the circumference, so that a uniform diameter can be obtained for the stator core.

In order to resolve the issue provided above, a stator manufacturing apparatus of the present invention, for manufacturing a stator for a rotary electric machine by shrink-fitting an outer cylinder to a core assembly having a plurality of phase windings wound to provide a cage-shaped coil, with segment cores forming a stator core being assembled to the outer periphery of the cage-shaped coil, comprises: a tapered guide unit comprising: a large-diameter portion whose diameter is larger than an outer diameter of the core of the stator; a small-diameter portion whose diameter is larger than an inner diameter of the outer cylinder and smaller than an inner diameter of the outer cylinder in a thermally expanded state, and a through hole with a taper, the through hole passing through the tapered guide unit from the large-diameter portion to the small-diameter portion, and the apparatus further comprises: a heating unit that heats and thermally expands the outer cylinder to increase an inner diameter of the outer cylinder; a driving unit that inserts the stator core into the outer cylinder while reducing an outer diameter of the stator core by permitting the stator core to pass through the through hole on and along the taper thereof, from a side of the large-diameter portion to a side of a small-diameter portion of the tapered guide unit; and a control unit that effects control in such a way that the stator core having a diameter reduced by the driving unit is inserted into the outer cylinder which is thermally expanded to increase the inner diameter thereof.

According to the present invention, the driving unit is adapted to reduce the outer diameter of the stator core by permitting the stator core to pass on and along the taper of the through hole formed in the tapered guide unit. Thus, a uniform diameter can be distributed throughout the stator core. In particular, the circularity (which is expressed by the difference between the radius of a maximum incircle and that of a minimum circumcircle) of the stator core in terms of its inner diameter can be reduced to 0.05 mm or less.

According to the present invention, the driving unit is adapted to insert the stator core into the outer cylinder while the diameter of the stator core is being reduced by permitting the stator core to pass on and along the taper of the through hole formed in the tapered guide unit. Thus, the radial reduction and the insertion into the outer cylinder (shrinkage fitting) can be achieved through a single step.

It is preferred that a heat insulating member is provided at a portion of the tapered guide unit, the portion being brought into contact with the heating unit when the stator core having the reduced diameter is inserted into the outer cylinder having the increased diameter.

Without the heat insulating member, the tapered guide unit, when coming into contact with the heating unit, will be heated and thermally expanded, disabling reduction in the diameter of the stator core to a desired smallness. On the other hand, the heat insulating member, if provided, can suppress the heat from the heating unit from being transferred to the tapered guide unit when the tapered guide unit comes into contact with the heating unit. Therefore, the diameter of the stator core can be reliably reduced to a desired size without thermally expanding the tapered guide unit, in a configuration where the tapered guide unit comes into contact with the heating unit for smooth insertion of the stator core into the outer cylinder.

It is preferred that the stator core is formed by laminating a plurality of steel plates in a direction along which the stator core is inserted into the outer cylinder; and the driving unit is provided with pressing units disposed vertically in a direction of inserting the stator core into the outer cylinder, so that the stator core can be held by the pressing units.

Each of the segment cores is formed by laminating electromagnetic steel plates. The direction of the lamination matches the direction of inserting the stator core into the outer cylinder, i.e. the direction in which the through hole is formed in the tapered guide unit for the insertion of the stator core. Therefore, in inserting the stator core into the through hole and into the outer cylinder, the segment cores may be applied with an external force that works against the direction of the insertion, i.e. an external force that works in the direction of peeling off the laminated electromagnetic steel plates.

In this regard, the pressing units, if provided, can suppress the radial expansion of the stator core when the stator core is inserted into the outer cylinder. Thus, the electromagnetic steel plates can be prevented from being peeled off or from suffering from any damage, when the stator core is inserted into the through hole or into the outer cylinder.

In order to resolve the issue provided above, a stator manufacturing method of the present invention, for manufacturing a stator for a rotary electric machine by shrink-fitting an outer cylinder to a core assembly having a plurality of phase windings wound to provide a cage-shaped coil, with segment cores forming a stator core being assembled to the outer periphery of the cage-shaped coil, comprises: a step of heating the outer cylinder so as to be thermally expanded to increase a diameter thereof; a step of inserting the core assembly into the outer cylinder having a diameter increased by the thermal expansion, using a tapered guide unit while an outer diameter of the core assembly is being reduced, the tapered guide unit comprising: a large-diameter portion whose diameter is larger than an outer diameter of the core of the stator; a small-diameter portion whose diameter is larger than an inner diameter of the outer cylinder and smaller than an inner diameter of the outer cylinder in a thermally expanded state; and a through hole with a taper, the through hole passing through the tapered guide unit from the large-diameter portion to the small-diameter portion, the outer diameter of the core assembly being reduced by permitting the core assembly to pass through the through hole on and along the taper thereof, from a side of the large-diameter portion to a side of a small-diameter portion of the tapered guide unit; and a step of cooling the outer cylinder to reduce the diameter thereof, immediately after the inserting step.

According to the present invention, the outer diameter of the stator core is reduced by permitting the stator core to pass on and along the taper of the through hole formed in the tapered guide unit. Thus, a uniform diameter can be obtained throughout the stator core. In particular, the circularity (which is expressed by the difference between the radius of a maximum incircle and that of a minimum circumcircle) of the stator core in terms of its inner diameter can be reduced to 0.05 mm or less.

According to the present invention, the stator core is inserted into the outer cylinder while the diameter of the stator core is being reduced by permitting the stator core to pass on and along the taper of the through hole formed in the tapered guide unit. Thus, the radial reduction and the insertion into the outer cylinder (shrinkage fitting) can be achieved through a single step.

DETAILED DESCRIPTION OF THE PREFERRED EMBODIMENTS

With reference to the accompanying drawings, hereinafter will be described in detail a stator manufacturing apparatus and a stator manufacturing method, according to an embodiment of the present invention. The embodiment that will be described here is only an example, and thus the stator manufacturing apparatus and the stator manufacturing method of the present invention are not intended to be limited by the embodiment provided below. The stator manufacturing apparatus and the stator manufacturing method of the present invention may be implemented in various modes after being modified and/or improved, for example, by a person skilled in the art within the scope not departing from the spirit of the present invention.

To begin with, hereinafter is described a configuration of a rotary electric machine 1 using a stator which has been obtained by using a stator manufacturing apparatus and a stator manufacturing method according to the present embodiment.

Figure 1:
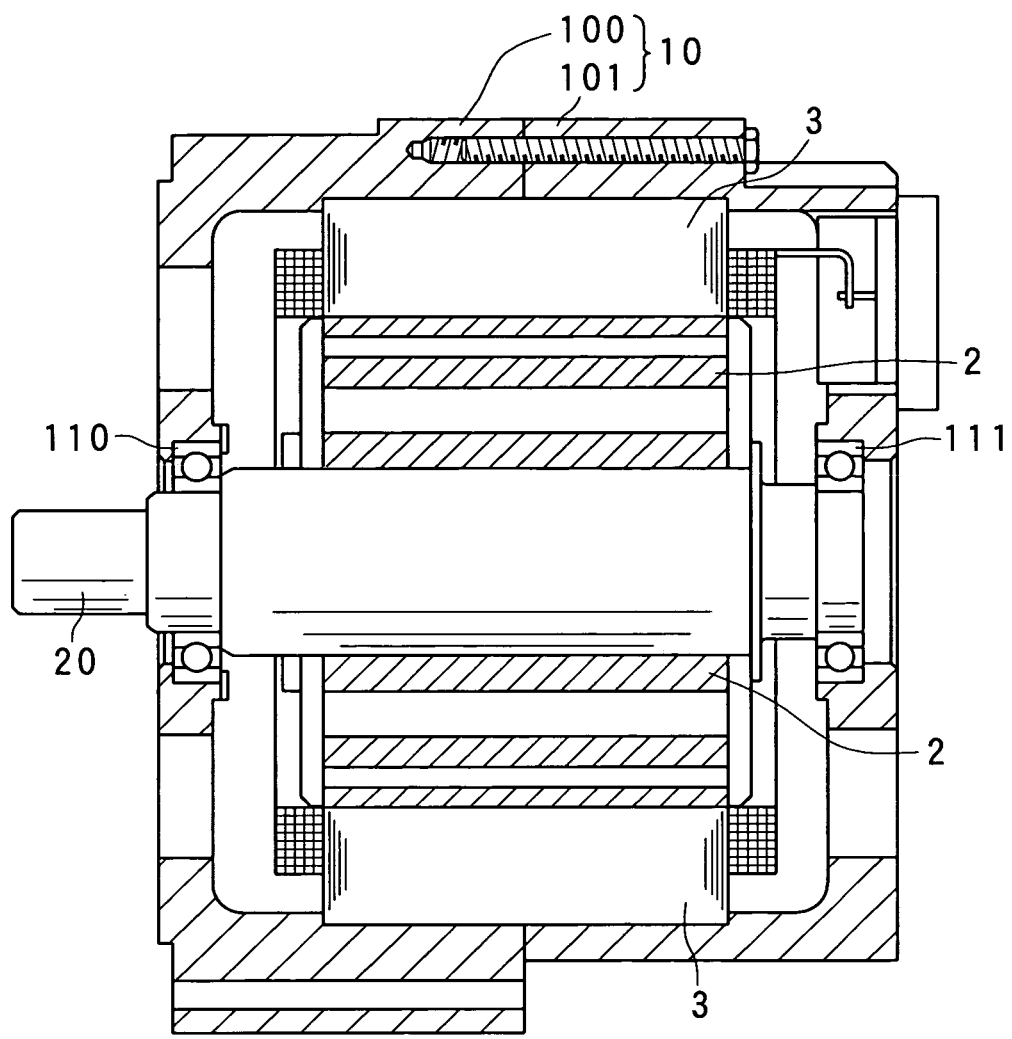
FIG. 1 is a schematic axial cross-sectional view illustrating a configuration of a rotary electric machine, according to an embodiment of the present invention.

As shown in FIG. 1, the rotary electric machine 1 includes: a housing 10 configured by joining the openings of a pair of substantially cylindrical bottomed housing members 100, 101; a rotary shaft 20 rotatably supported by the housing 10 via bearings 110, 111; a rotor 2 secured to the rotary shaft 20; and a stator 3 secured to the housing 10 at the position of surrounding the rotor 2 in the housing 10.

Figure 2:
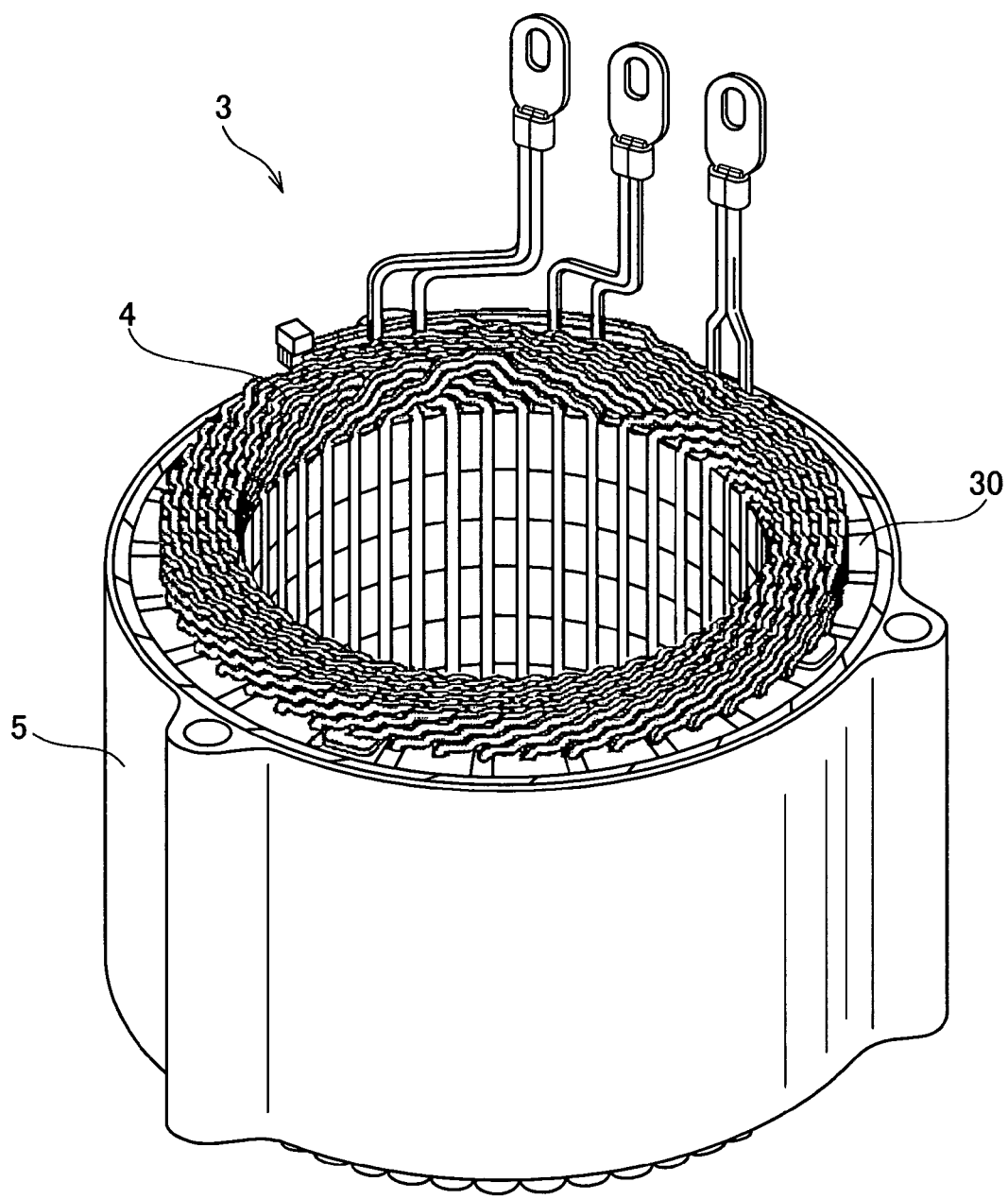
FIG. 2 is a perspective view illustrating a stator according to the embodiment.

The rotor 2 includes permanent magnets circumferentially forming a plurality of alternately differentiated poles on the outer peripheral side of the rotor 2, the side facing the inner peripheral side of the stator 3. The number of the poles of the rotor 2 depends on the rotary electric machine concerned, and may be varied. The present embodiment uses an eight-pole (four N poles and four S poles) rotor. As shown in FIG. 2, the stator 3 is configured by a stator core 30, a three-phase stator coil 4 formed of a plurality of phase windings, and an outer cylinder 5 into which the stator core 30 is inserted.

Figure 3:
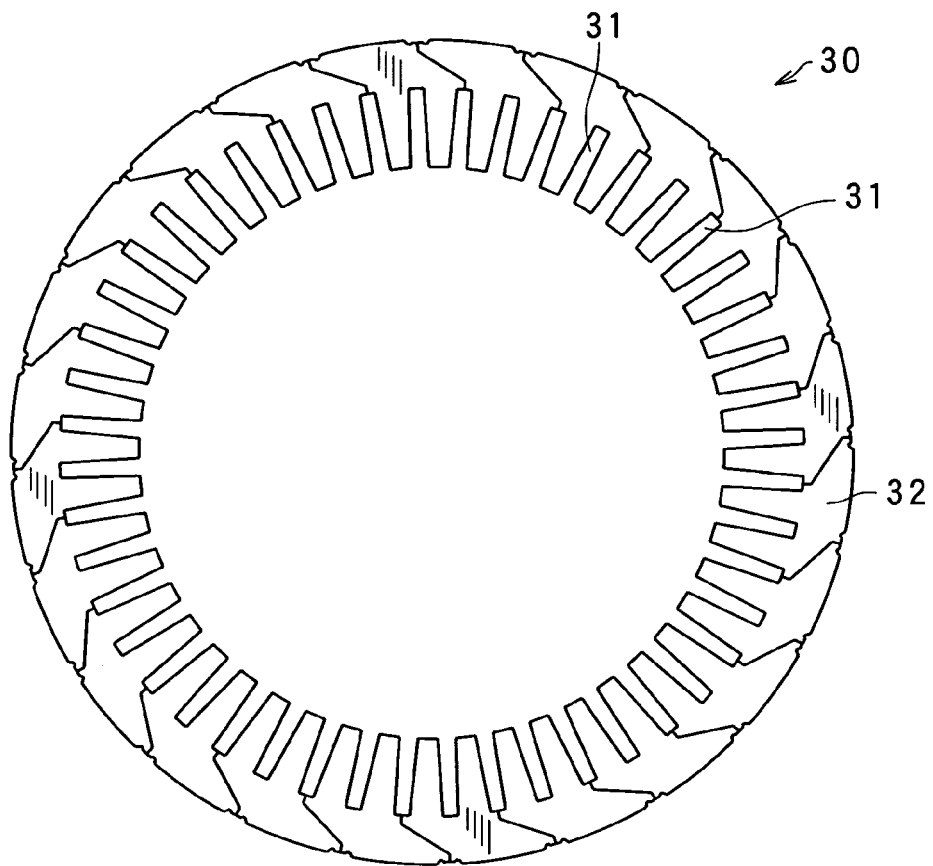
FIG. 3 is a plan view illustrating a stator core according to the embodiment.

As shown in FIG. 3, the stator core 30 has an annular shape, with a plurality of slots 31 being formed in its inner peripheral face. The plurality of slots 31 are formed so that their depthwise direction coincides with the radial direction. The number of the slots 31 formed in the stator core 30 is set in such a way that two slots are allocated to one phase of the stator coil 4, for each of the poles of the rotor 2. Accordingly, in the present embodiment, forty-eight slots are formed as resulted from a calculation: 8 (poles)×3 (phases)×2 (slots)=48.

Figure 4:
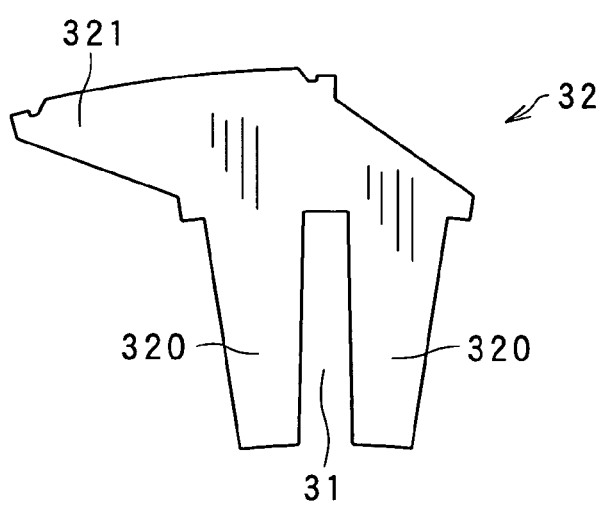
FIG. 4 is a plan view illustrating a laminated segment core according to the embodiment.

The stator core 30 is formed by circumferentially connecting a predetermined number (twenty-four in the present embodiment) of segment cores 32 shown in FIG. 4. Each segment core 32 defines one slot 31, and at the same time, each circumferentially adjacent two segment cores 32 define one slot 31. Specifically, each segment core 32 has a pair of teeth 320 extending radially inward and a back core 321 connecting the teeth 320 with each other on a radially outer side.

The segment cores 32 configuring the stator core 30 are each formed of laminated electromagnetic steel plates. An insulating film is disposed inbetween the laminated electromagnetic steel plates. The segment cores 32 configuring the stator core 30 may not only be formed of such a laminated body of electromagnetic steel plates, but may also be formed of known thin metal sheets and insulating films.

Figure 5:
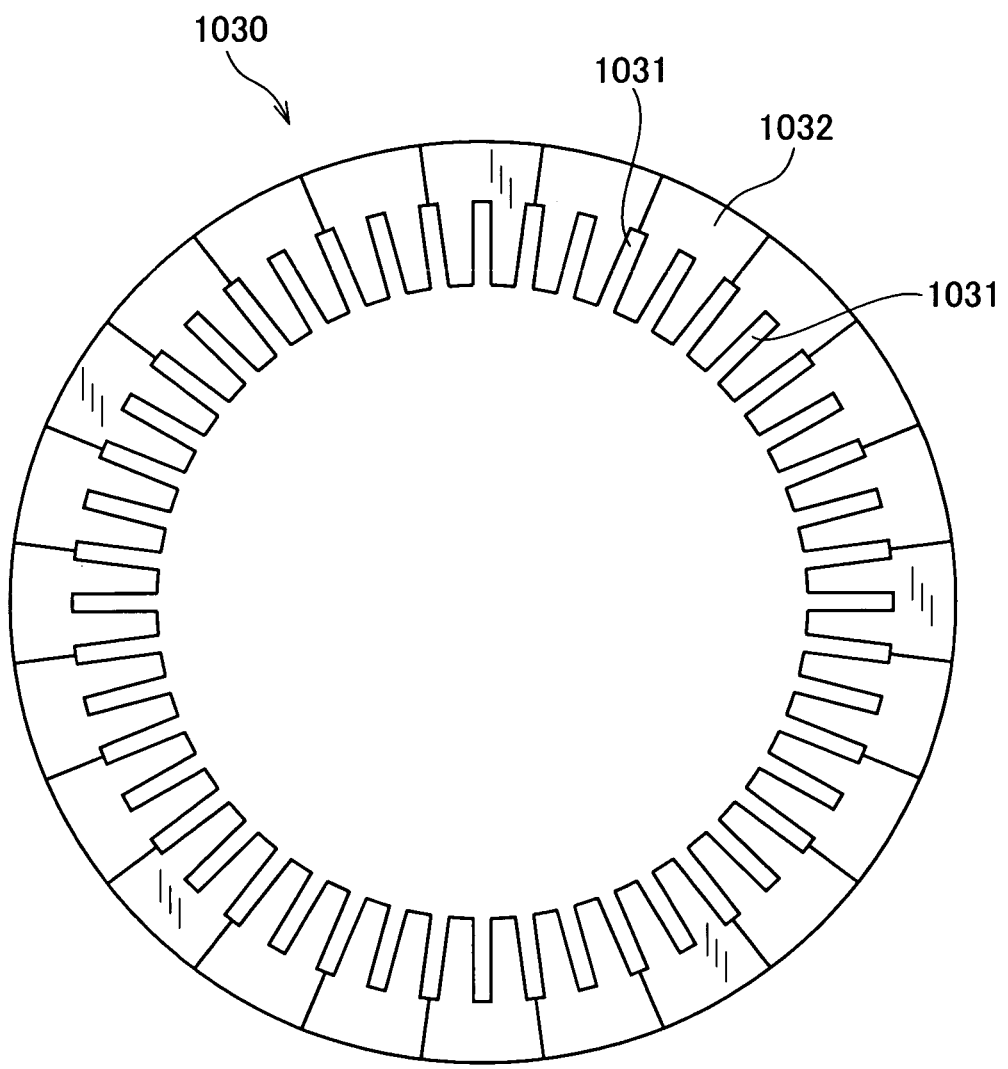
FIG. 5 is a plan view illustrating a stator core according to a modification.
Figure 6:
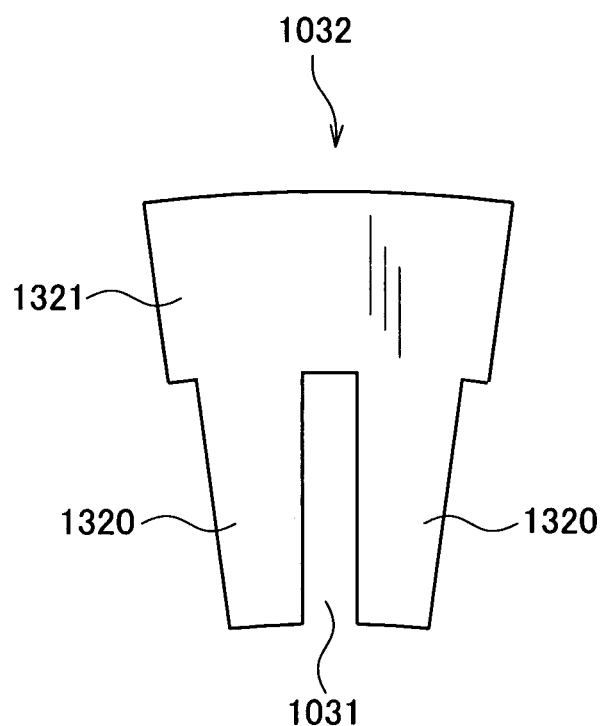
FIG. 6 is a plan view illustrating a laminated segment core according to the modification.

The shape of the stator core applicable to the present invention is not only limited to the one shown in FIGS. 3 and 4, but may, for example, be the one shown in FIGS. 5 and 6.

An example of a stator core 1030 shown in FIGS. 5 and 6 is formed by circumferentially connecting segment cores 1032 to provide an annular shape, with a plurality of slots 1031 being formed in its inner peripheral face. Each segment core 1032 defines one slot 1031, and at the same time, circumferentially adjacent two segment cores 1032 defines one slot 1031. Each slot 1031 is defined by radially inwardly extending two teeth 1320 adjacent to each other. Each back core 1321 of this example has a shape that will not permit superposition by another segment core 1032 in the radial direction. The number of the segment cores 1032, the material thereof and the like are the same as those of the segment cores 32 shown in FIG. 4.

Figure 7A:
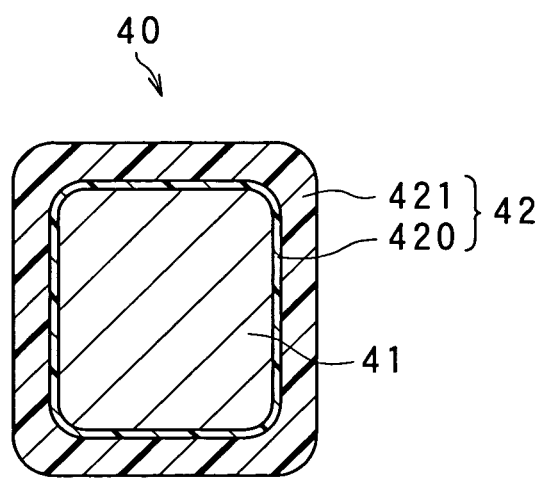
FIG. 7A is a cross-sectional view illustrating a winding configuring a stator coil, taken along a line perpendicular to the longitudinal direction of the winding, according to the embodiment.

The stator coil 4 is configured by winding up a plurality of windings 40 using a predetermined winding method. As shown in FIG. 7A, each of the windings 40 configuring the stator coil 4 is formed of a copper conductor 41 and an insulating film 42 consisting of an inner layer 420 and an outer layer 421 which cover the outer periphery of the conductor 41 for insulation.

Thus, the insulating film 42 consisting of the inner and outer layers 420, 421 has a large thickness, which negates the need for inserting pieces of insulating paper between the windings 40 in order to establish insulation therebetween. However, pieces of insulating paper may be disposed between the windings 40, or between the stator core 30 and the stator coil 4.

Figure 7B:
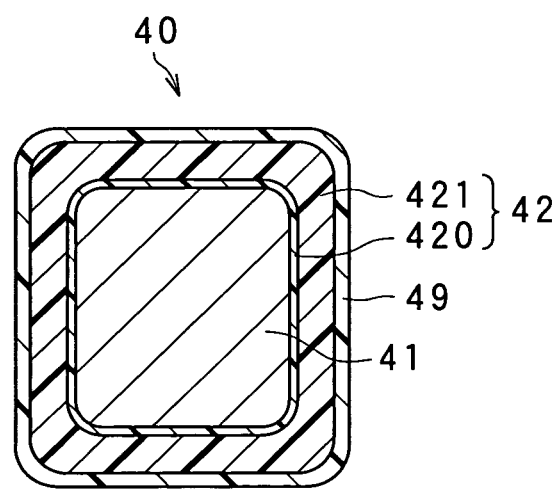
FIG. 7B is a cross-sectional view of a modification of the winding illustrated in FIG. 7A.

As shown in FIG. 7B, a fusing material 49 made such as of an epoxy resin may be coated on the outer periphery of the insulating film 42 consisting of the inner and outer layers 420 and 421, to form each winding 40 of the stator coil 4. In this case, the fusing material 49 will be melted faster than the insulating film 42 by the heat generated from the rotary electric machine 1. Therefore, the plurality of windings 40 disposed in the same slot 31 are thermally adhered to each other by the fusing material 49. As a result, the plurality of windings 40 disposed in the same slot 31 are integrated to turn the windings 40 to a rigid body, whereby the mechanical strength of the windings 40 in the slot 31 is enhanced.

Figure 8:
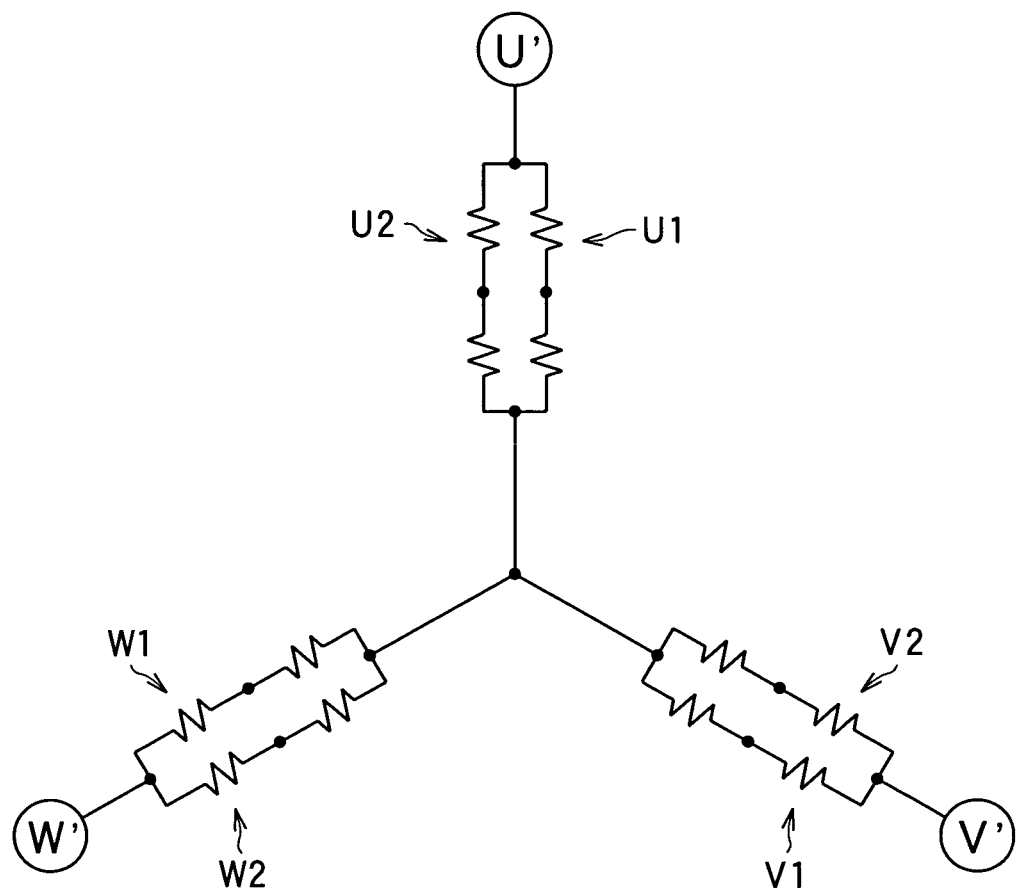
FIG. 8 is a view illustrating a connection of the stator coil according to the embodiment.

As shown in FIG. 8, the stator coil 4 is formed of three-phase windings (U1, U2, V1, V2, W1, W2), each phase being made up of two wires.

Figure 9:
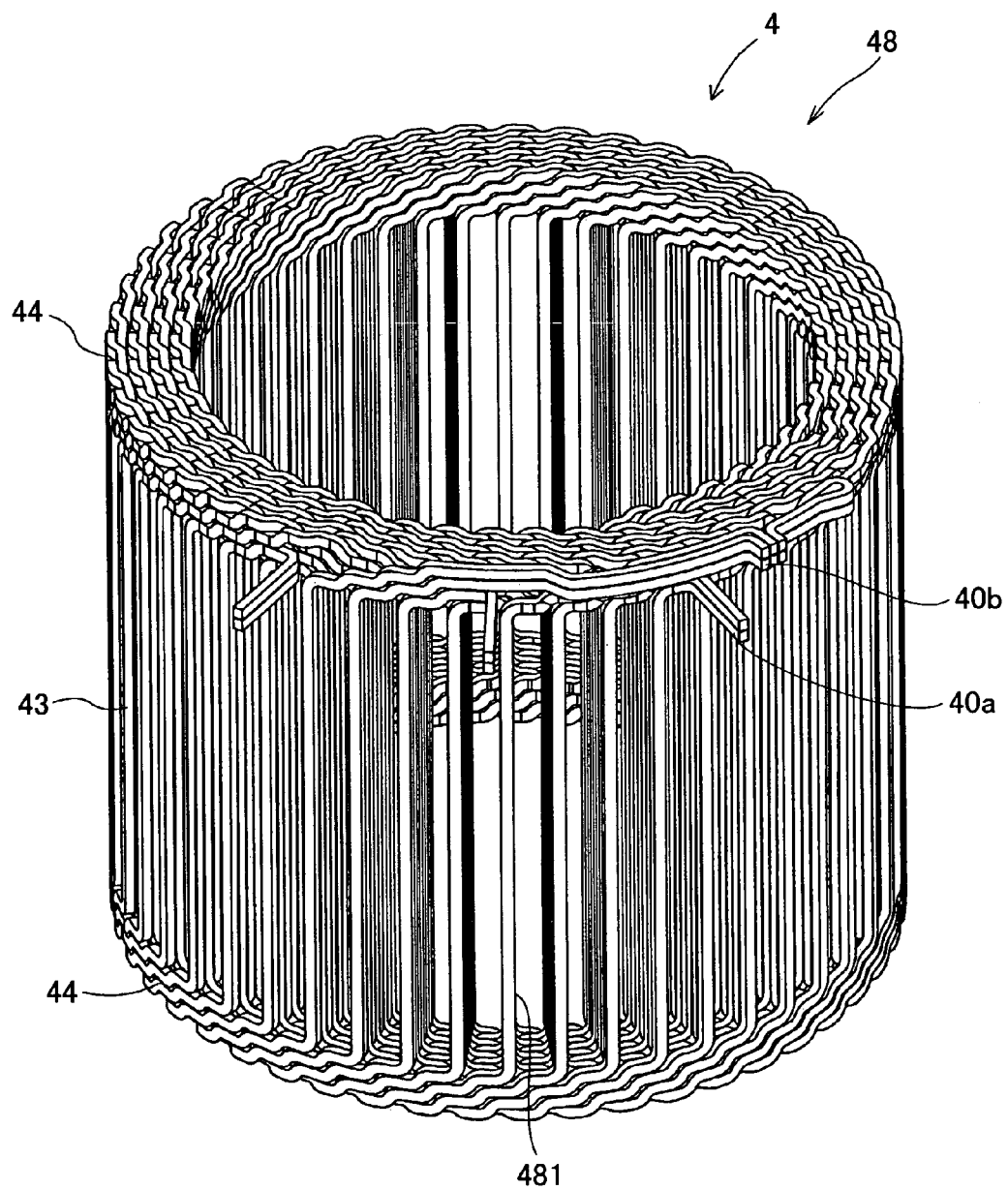
FIG. 9 is a perspective view illustrating a wound body that is the stator coil according to the embodiment.

As shown in FIG. 9, the stator coil 4 is a wound body 48 obtained by winding an integrated body 47 (see FIG. 10) in which the plurality of windings 40 are integrated into a predetermined shape. The windings 40 configuring the stator coil 4 are formed into a shape in which wave winding are provided along the circumference of and inside the stator core 30.

Each of the windings 40 configuring the stator coil 4 includes straight portions 43 each of which is accommodated in each slot 31 of the stator core 30 (each of these portions is hereinafter referred to as a "slot-accommodation portion 43"), and turn portions 44 each connecting adjacent slot-accommodation portions 43. The slot-accommodation portions 43 are accommodated in every predetermined ordinal slot 31 (in the present embodiment, every sixth slot 31 as calculated from: 3 (phases)×2 (slots)=6 (slots)). The turn portions are formed, being axially projected from each end face of the stator core 30.

The stator coil 4 is formed in such a way that both ends of each of the plurality of windings 40 are projected from an axial end face of the stator core 30 and that the plurality of windings 40 are wound in a manner of wave-winding in the circumferential direction. One phase of the stator coil 4 is formed by mutually joining the ends of a first winding 40a and a second winding 40b by welding. In other words, one phase of the stator coil 4 is formed of a pair of electrically conductive shaped wires, with the ends being mutually joined.

The slot-accommodation portions 43 of the first winding 40a and the slot-accommodation portions 43 of the second winding 40b are accommodated in the same slots 31. In this regard, the slot-accommodation portions 43 of the first winding 40a are ensured to be positioned, being alternated by the slot-accommodation portions 43 of the second winding 40b in the depthwise direction of the individual slots 31. A joint 45 between the first and second windings 40a, 40b is formed in the slot-accommodation portion 43 that serves as a return portion 46. The winding direction of the first and second windings 40a, 40b is reversed in the return portion 46.

Figure 10:
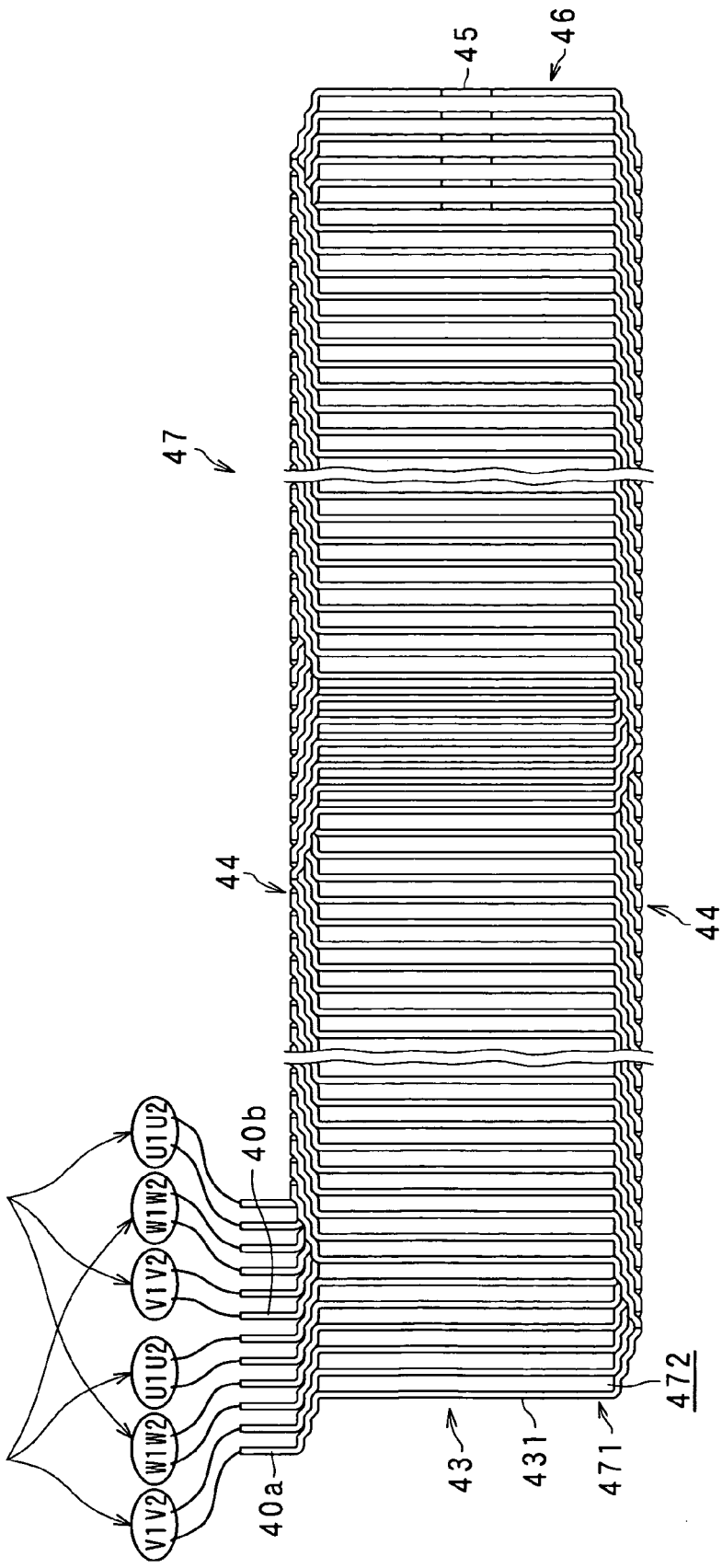
FIG. 10 is a development view illustrating the stator coil, or, a plan view of an integrated body before being wound as the stator coil, according to the embodiment.

FIG. 10 is a development view illustrating the stator coil 4, or a plan view illustrating the integrated body 47 before being wound. The stator coil 4 has six pairs of the first and second windings 40a, 40b that have different winding directions. A coil of 3-phase (U, V, W)×2-slot (double-slot coil) is provided using these six pairs of windings. In each pair, the end of the first winding 40a, which is opposite to the end on the side of the neutral point (or the side of the phase terminal), is connected to the end of the second winding 40b, which is opposite to the end on the side of the phase terminal (or the side of the neutral point), via the slot-accommodation portion 43 that is the return portion 46. The same connecting method is used for the individual phases of the windings 40.

Hereinafter will be described a method for manufacturing the stator 3. Briefly, in the method, the stator core 30 is assembled into the stator coil 4 (wound body 48) to obtain an assembly 50 (see FIG. 11), which is then shrink-fitted to the outer cylinder 5 to obtain the stator 3. The assembly 50 configures the core assembly of the present invention.

In the following description, when a term "radial" or "radially" is used, the term refers to the radial direction of a core member or a wound body. Also, when a term "circumferential" or "circumferentially" is used, the term refers to the circumferential direction of the core member of the wound body.

<Shaping Step>

First, twelve shaped wires are produced from twelve electrically conductive wires. Each of the shaped wires here includes a plurality of straight portions 431 extending parallel to each other and juxtaposed in the longitudinal direction of the shaped wire, and a plurality of turn portions 44 for connecting the adjacent straight portions 431 with each other alternately on one end side and on the other end side.

<Integrating Steps>

The twelve shaped wires are integrated with each other to form the integrated body 47. In the integrated body 47, six pairs of the shaped wires are juxtaposed in the longitudinal direction of the integrated body 47.

Each of the pairs consists of the first winding 40a and the second winding 40b, each of which is made up of the shaped wire.

The ends of the first and second windings 40a, 40b in each pair so are joined by welding to provide the joint 45. It should be appreciated that the twelve shaped wires may first be integrated, followed by joining the ends of the first and second windings 40a, 40b of each pair, or the ends of the first and second windings 40a, 40b may first be joined, followed by integration of the six pairs.

In each pair of windings in the integrated body 47, the plurality of straight portions 431 of the first winding 40a and the plurality of straight portions 431 of the second winding 40b are superposed with each other to provide a plurality of straight superposition portions 471 in the longitudinal direction of the integrated body 47. However, no superposition is permitted to occur as to the six straight portions 431 including the return portions 46 and serving as a winding start portion, and the six straight portions 431 serving as a winding end portion, at a winding-up step that will be described later.

<Winding-Up Step>

The integrated body 47 is wound with a predetermined number of turns (e.g., three or four turns) so that the return portions 46 will be positioned on the side of the axis, to form the wound body 48 shown in FIG. 9. In winding up the integrated body 47, the turn portions 44 are plastically deformed to create a predetermined wound radius.

For example, the turn portions 44 may be formed by means of a die having a predetermined round shaping face or a predetermined shaping roller. The details of the winding-up step will be described later.

The wound body 48 is circumferentially provided with a plurality of straight stack portions 481, in each of which the plurality of straight superposition portions 471 of one pair of shaped wires are radially stacked by the number corresponding to the number of turns. Specifically, in each straight stack portion 481, a number of the straight portions 431 equal to twice the number of turns are superposed with each other in radial alignment. The plurality of straight stack portions 481 are positioned along the circumference with small intervals (gaps) therebetween.

<Assembling Step>

Figure 11:
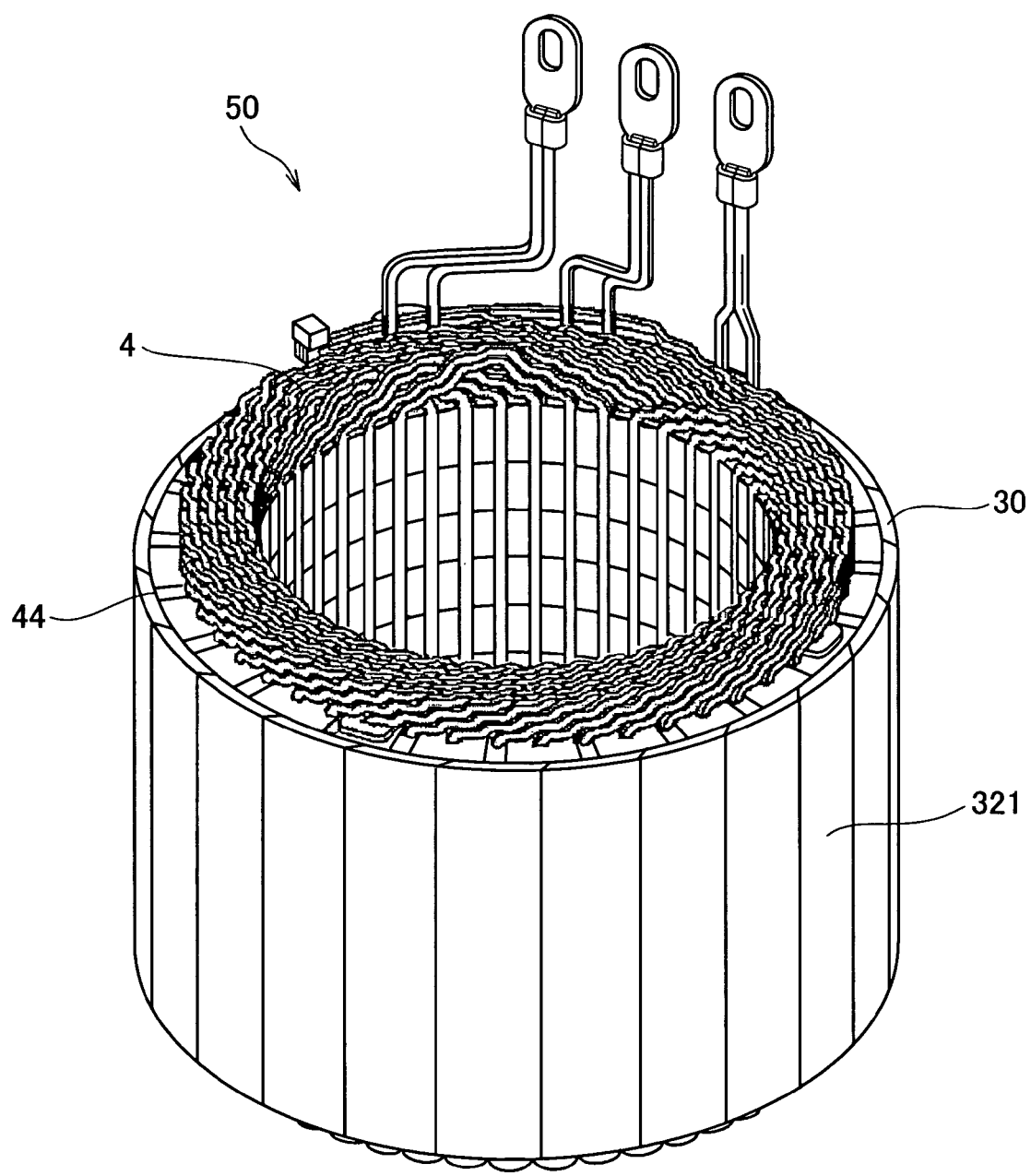
FIG. 11 is a perspective view illustrating an assembly, according to the embodiment.

For the wound body 48 obtained in this way, the teeth 320 of each of the segment cores 32 are radially inserted into the respective gaps between adjacent straight stack portions 481 to mutually couple the adjacent segment cores 32 for assemblage, to thereby obtain the assembly 50 (see FIG. 11).

<Inserting (Shrink-Fitting) Step>

Figure 12:
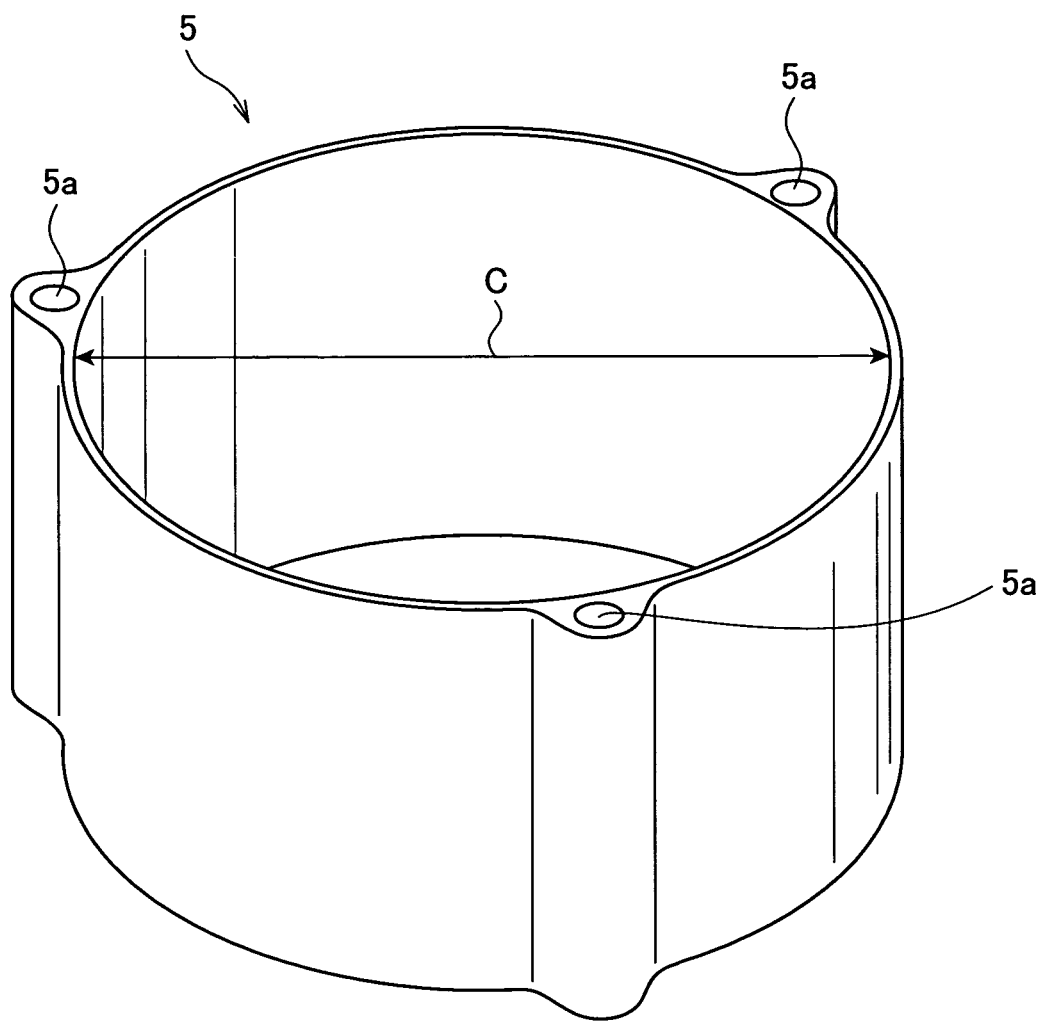
FIG. 12 is a perspective view illustrating an outer cylinder according to the embodiment.

The assembly 50 is inserted and fitted into the outer cylinder 5 (see FIG. 12). FIG. 11 is a perspective view illustrating the assembly 50. As shown, a back core 321, which is an axial stack of the segment cores 32, is located at the outer periphery of the assembly 50. FIG. 12 is a perspective view illustrating the outer cylinder 5. The outer cylinder 5 has a thickness of 2 mm, for example, and is formed of a magnetic flux permeable material, such as low carbon steel. The outer cylinder 5 is provided with through bores 5a used for securing the stator 3 to the housing 10. The inner diameter of the outer cylinder 5 here is expressed by C.

Figure 13:
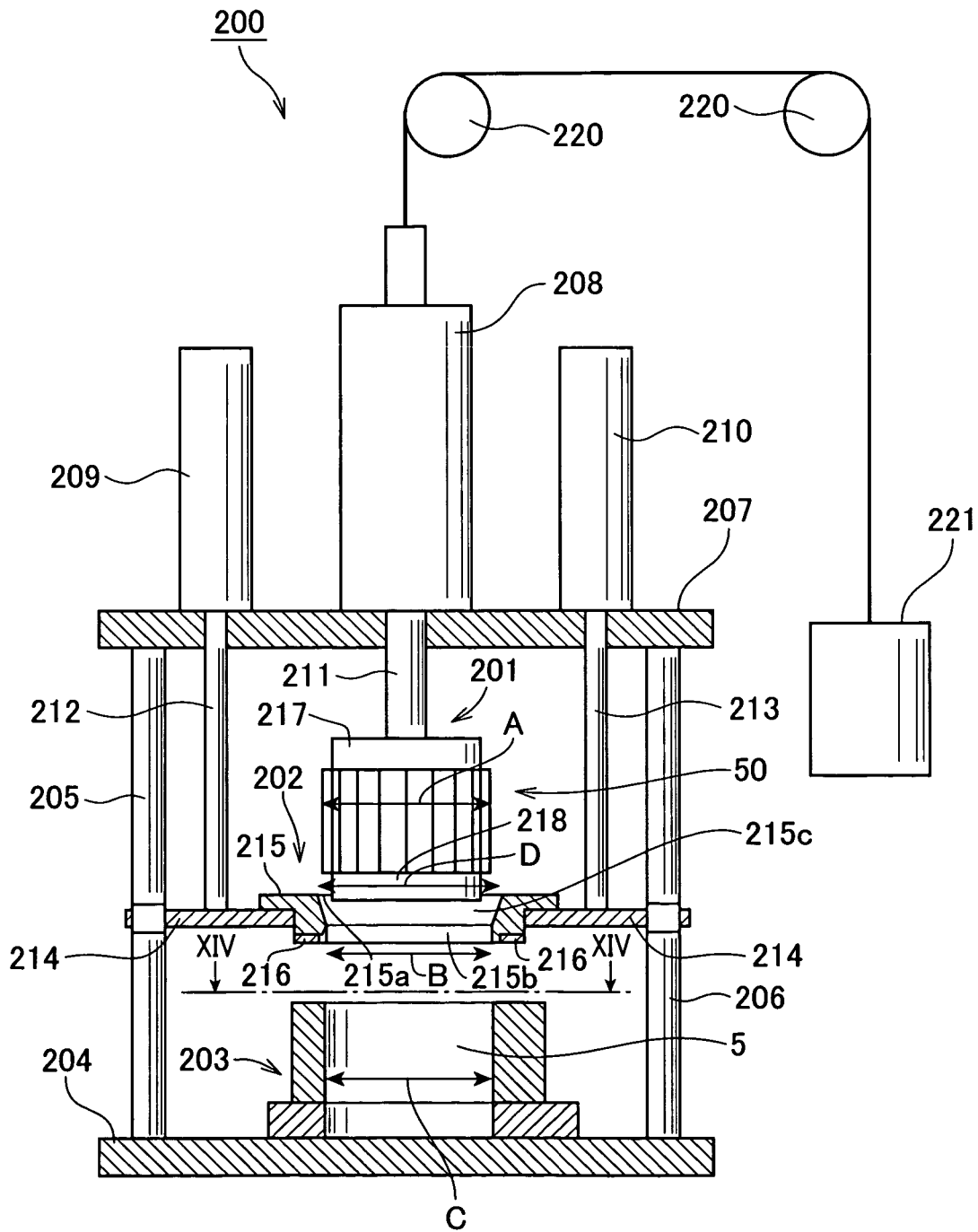
FIG. 13 is a schematic cross-sectional side view illustrating a configuration of a stator manufacturing apparatus according to the embodiment.

At the inserting step of this example, the stator manufacturing apparatus of the present embodiment is used. The following is a description on the stator manufacturing apparatus. FIG. 13 is a schematic cross-sectional side view illustrating a configuration of the stator manufacturing apparatus according to the present embodiment. FIG. 13 shows a state where the assembly 50 and the outer cylinder 5 are mounted on a stator manufacturing apparatus 200.

The stator manufacturing apparatus 200 is configured by a support unit 201 that supports the assembly 50, a tapered guide unit 202 that reduces the diameter of the outer periphery of the assembly 50, and a heating unit 203 that heats the outer cylinder 5.

The assembly 50 is mounted on the support unit 201, being sandwiched between an upper pressing unit 217 and a lower pressing unit 218 for fixation. The heating unit 203 is located on a base 204. Column supports 205, 206 are provided being fixedly positioned between the base 204 and a top plate 207. The tapered guide unit 202 is supported by a support plate 214 which is provided so as to be vertically movable on the column supports 205, 206.

The support unit 201 is secured to a shaft 211 of an air cylinder 208, so that the air cylinder 208 can lift up and down the support unit 201. A balancing weight 221 is provided at the air cylinder 208 through pulleys 220 to ensure balance between the weight of the balancing weight 221 and the weight of the support unit 201.

The support plate 214 is fixed to shafts 212, 213 of air cylinders 209, 210, respectively, so that the air cylinders 209, 210 can raise and lower the support plate 214, or the tapered guide unit 202.

The tapered guide unit 202 includes an annular member 215 having a structure consisting of: a large-diameter portion 215a having an inner diameter D larger than an outer diameter A of the assembly 50 that is the stator core; a small-diameter portion 215b having an inner diameter B larger than the inner diameter C of the outer cylinder 5 and smaller than an inner diameter C' of the outer cylinder 5 in a thermally expanded state; and a through hole 215c which is tapered and passes through the tapered guide from the large-diameter portion 215a to the small-diameter portion 215b. The taper angle of the through hole 215c is 5°, for example.

The inner diameter B of the smaller-diameter portion 215b is made larger than the inner diameter C of the outer cylinder 5 by, for example, about 0.2 mm. The dimensional difference of the outer cylinder 5 between before and after being heated (C'-C) at a temperature, for example, of 300° C. is about 0.6 mm.

The air cylinders 208, 209 and 210 serve as a driving unit. Specifically, the driving unit is adapted to permit the assembly 50, i.e. the stator core, to pass on and along the taper of the through hole 215c, from the side of the large-diameter portion 215a to the side of the small-diameter portion 215b of the tapered guide unit 202. The driving unit is then adapted to further insert the assembly 50 into the outer cylinder 5, while permitting the diameter of the assembly 50 to be reduced.

The annular member 215 of the tapered guide unit 202 has a bottom surface which is provided with an annular heat insulating member 216 formed of a flat plate. The heat insulating member 216 protects the annular member 215 from the heat emitted from the heating unit 203. Thus, the inner diameter of the small-diameter portion 215b can be prevented from being increased due to thermal expansion that would otherwise have been caused by the heat. The heat insulating member 216 is formed of ceramic, or the like.

Figure 14:
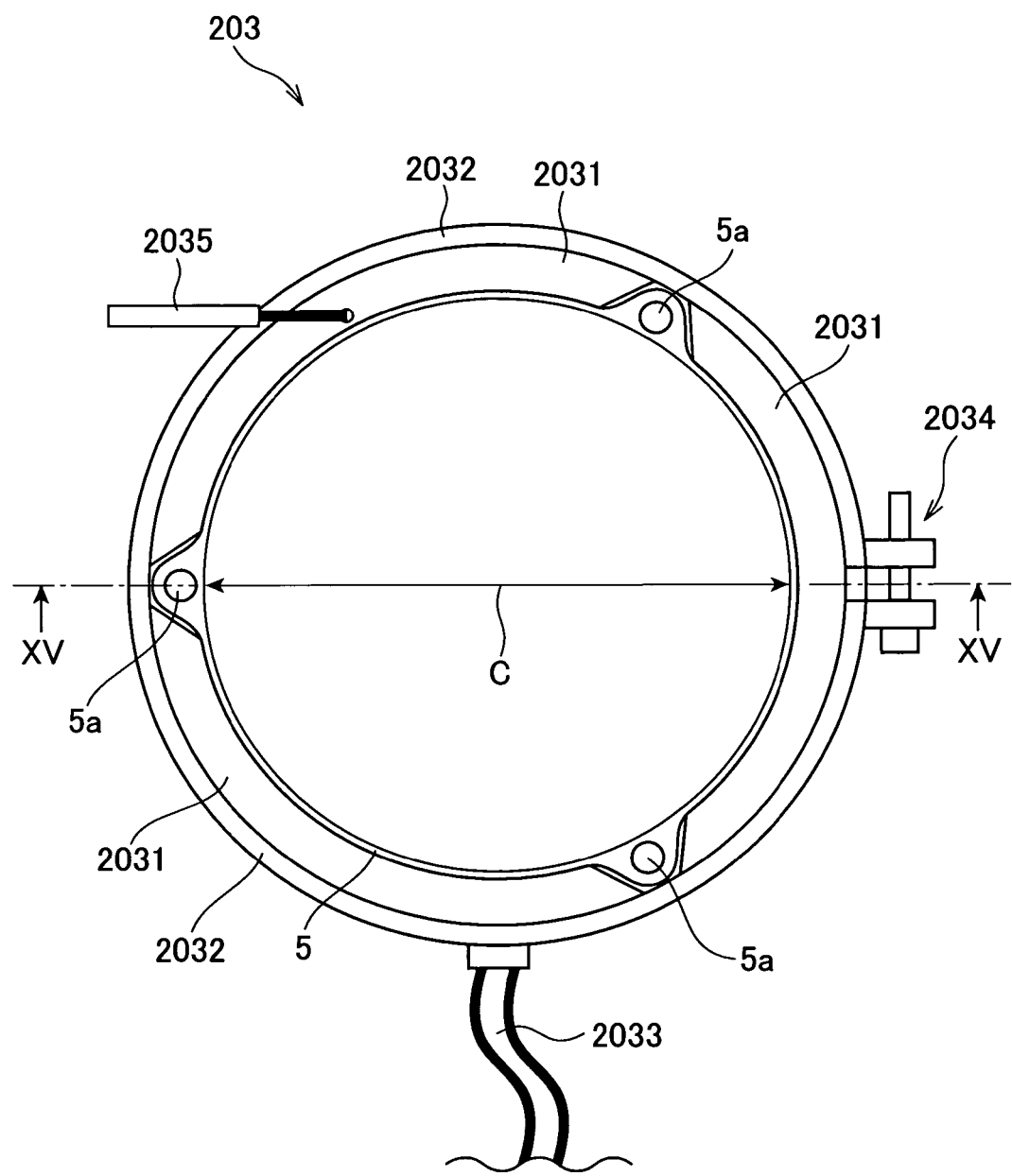
FIG. 14 is a plan view illustrating a heating unit as viewed from a direction XIV indicated in FIG. 13.
Figure 15:
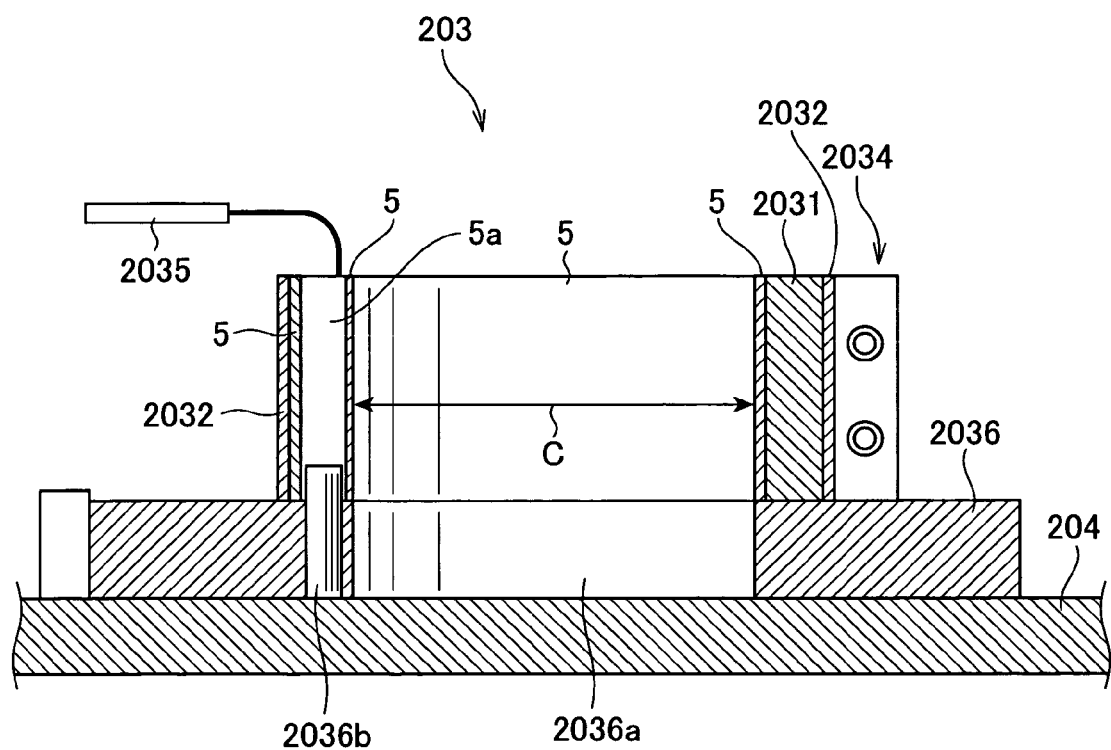
FIG. 15 is a cross-sectional side view of the heating unit as viewed from a direction XV indicated in FIG. 14.

Hereinafter is described a structure of the heating unit 203. FIG. 14 is a plan view of the heating unit 203 as viewed from the direction XIV indicated in FIG. 13. FIG. 15 is a cross-sectional side view of the heating unit 203 as viewed from the direction XV indicated in FIG. 14.

The heating unit 203 has a band heater 2032 that generates heat with the supply of current via a power source cord 2033. The outer cylinder 5 is accommodated inside the band heater via a heat transfer member 2031. The band heater 2032 is wound about the outer periphery of the heat transfer member 2031 and fixed by a crank bolt 2034.

The heat transfer member 2031 is formed, for example, of a copper block to have a shape that matches the outer peripheral shape of the outer cylinder 5 (e.g. matches the peripheral shape of each of the so through bores 5a and the curvature of the outer cylinder 5). Specifically, the heat transfer member 2031 is provided in such a way that the heat from the band heater 2032 can be transferred throughout the outer peripheral surface of the outer cylinder 5.

The temperature of the outer cylinder 5, which has been raised by the heat from the band heater 2032, is sensed by a temperature sensor 2035, such as a thermo-electric pile, and inputted to a control unit 250 (see FIG. 18) that will be described later.

As shown in FIG. 15, a heat insulating board 2036 is fixed in position on the base 204. The outer cylinder 5, the heat transfer member 2031 and the band heater 2032 are provided on the heat insulating board 2036.

The heat insulating board 2036 is made of ceramic, or the like, with a gap 2036a farmed at its center. The gap 2036a accommodates the lower pressing unit 218 when the assembly 50 has been inserted into the outer cylinder 5. The heat insulating board 2036 is also provided with three fixing pins 2036b to be fitted to the respective three through bores 5a of the outer cylinder 5 to place the outer cylinder 5 in position. The heat insulating board 2036 contributes to suppressing transfer of heat from the heating unit 203 to the base 204 and preventing positional deviation of the column supports 205, 206 on the base 204.

Figure 16:
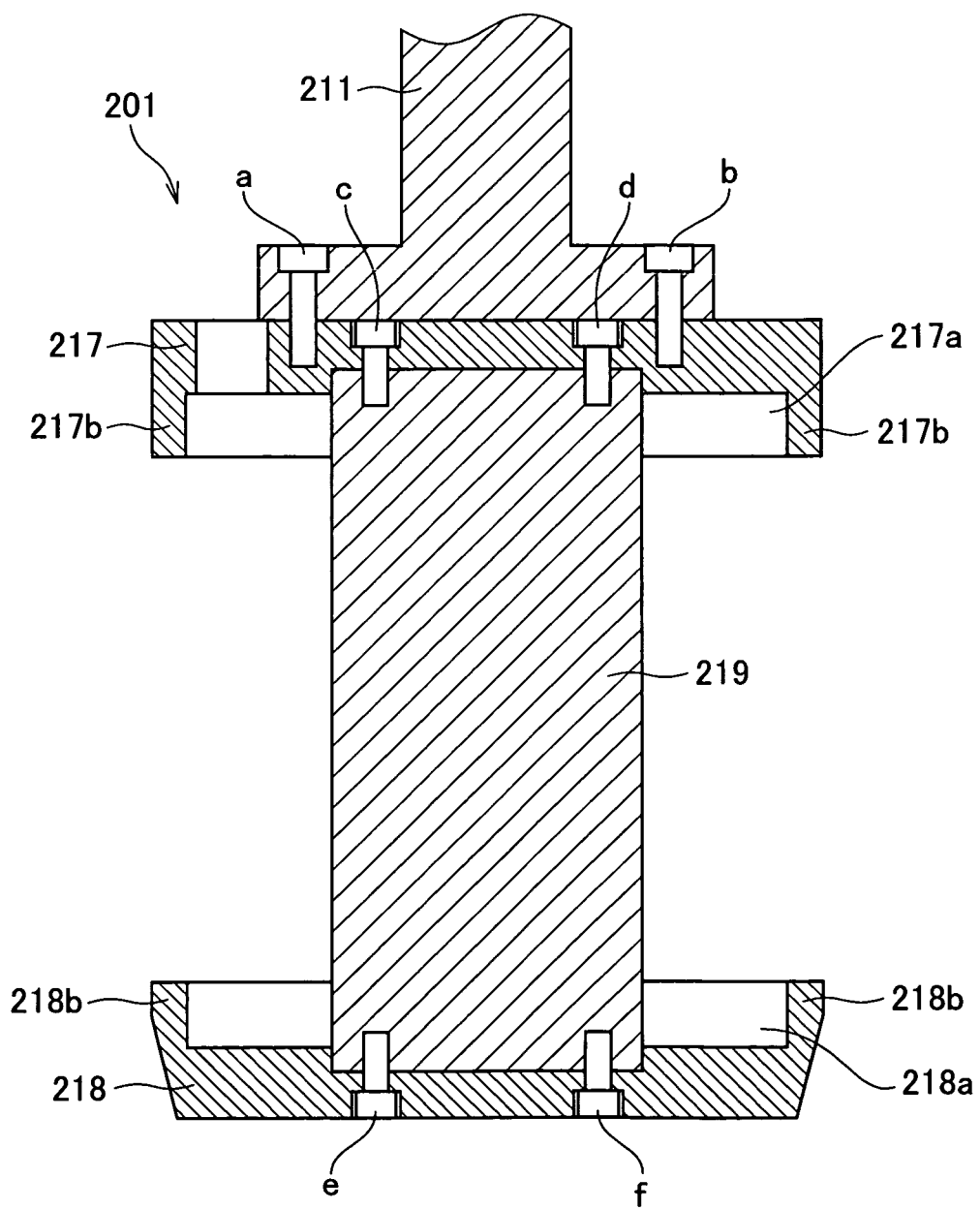
FIG. 16 is a cross-sectional side view illustrating a support unit illustrated in FIG. 13, in a state before being mounted with the assembly.
Figure 17:
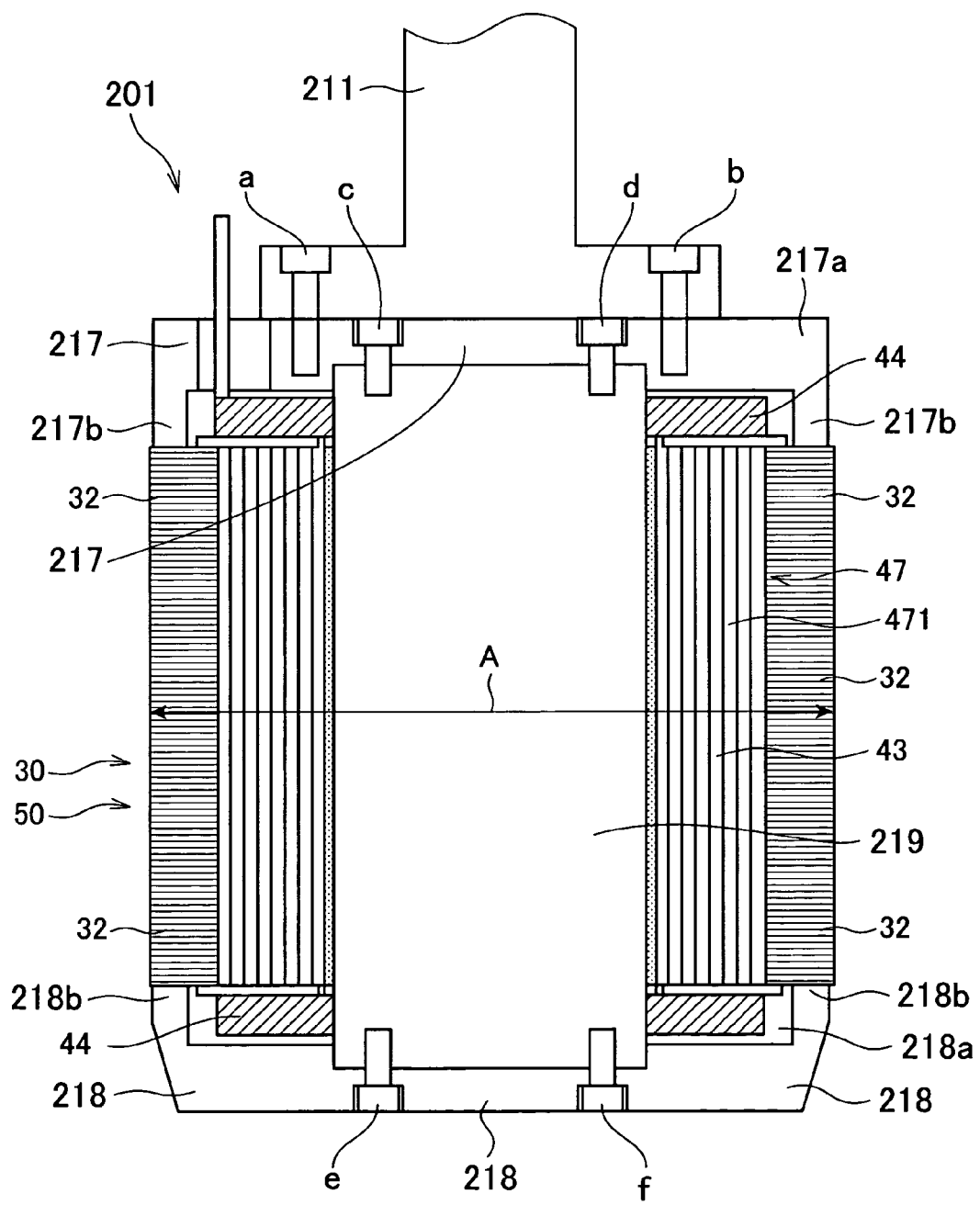
FIG. 17 is a cross-sectional side view illustrating the support unit illustrated in FIG. 13, in a state after being mounted with the assembly.

The structure of the support unit 201 is now described. FIGS. 16 and 17 are cross-sectional side views of the support unit 201 shown in FIG. 13. Specifically, FIG. 16 shows a state before the assembly 50 is mounted and FIG. 17 shows a state after the assembly 50 has been mounted. It should be appreciated that, in FIG. 17, hatching is omitted from the cross-sectional portion of the support unit 201 for the sake of good viewability.

The support unit 201 is configured by the upper and lower pressing units 217, 218 and a core member 219. In mounting the assembly 50, the core member 219 is inserted into the assembly 50 along its inner periphery. The resultant body is then vertically sandwiched between the upper and lower pressing units 217, 218, followed by fixation with bolts c, d, e and f. In this case, predetermined tightening torque is applied to the bolts c, d, e and f. With this torque, the force pressing the upper and lower pressing units 217, 218 against the assembly 50 for fixation, works in such a way that the assembly can be suppressed from being radially expanded at the time of insertion into the outer cylinder, and that, at the same time, no influence wilt be given to the radial reduction of the assembly to the inner diameter B of the through hole 215b of the tapered guide unit 202.

The support unit 201 is fixed to the shaft 211 of the air cylinder 208 by means of bolts a and b. The upper and lower pressing units 217, 218 have gaps 217a, 218a, respectively.

The gaps 217a, 218a permit the respective turn portions (coil ends) 44 to escape thereto, when the assembly 50 has been mounted on the support unit 201.

Further, the upper and lower pressing units 217, 218 have contact portions 217b, 218b, respectively. The contact portions 217b, 218b play a role of preventing the stack of the segment cores 32 from detaching from the coil or being deviated from each other, by coming into contact with and pressing the segment cores 32.

Figure 18:
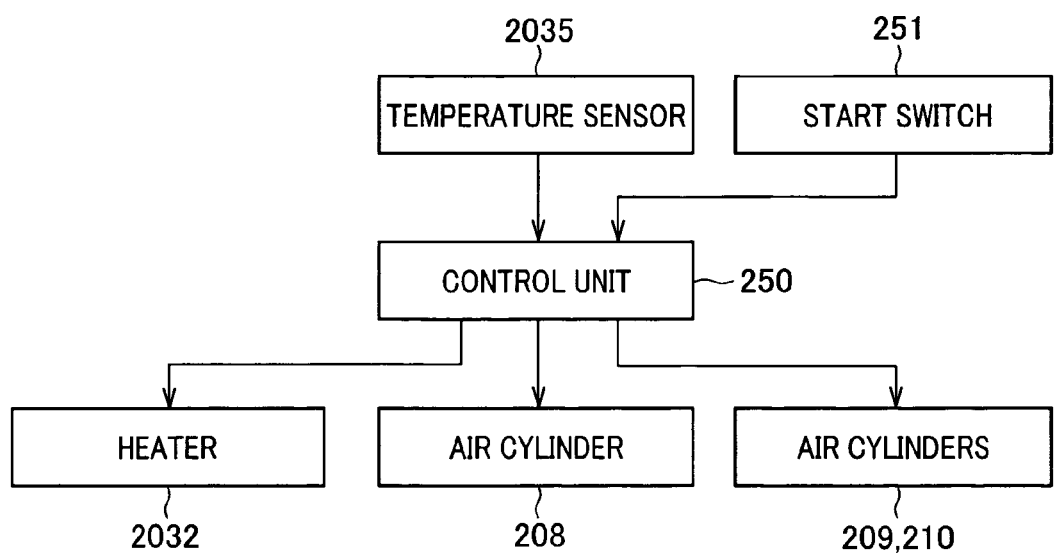
FIG. 18 is a block diagram illustrating a configuration for controlling the operation of the stator manufacturing apparatus illustrated in FIG. 13.

Hereinafter is described a configuration associated with the operation control of the stator manufacturing apparatus 200. FIG. 18 is a block diagram illustrating the configuration that controls the operation of the stator manufacturing apparatus 200 shown in FIG. 13.

The stator manufacturing apparatus 200 starts operation when a start switch 251 is operated by an operator. A control unit 250 includes CPU, RAM and ROM. The control unit 250 receives an input signal indicative of the operation of the start switch 251, as well as an input so signal indicative of a temperature sensed by the temperature sensor (thermo-electric pile) 2035. The control unit 250 also drives and controls the heater (band heater) 2032, the air cylinders 208, 209 and 210.

Figure 19:
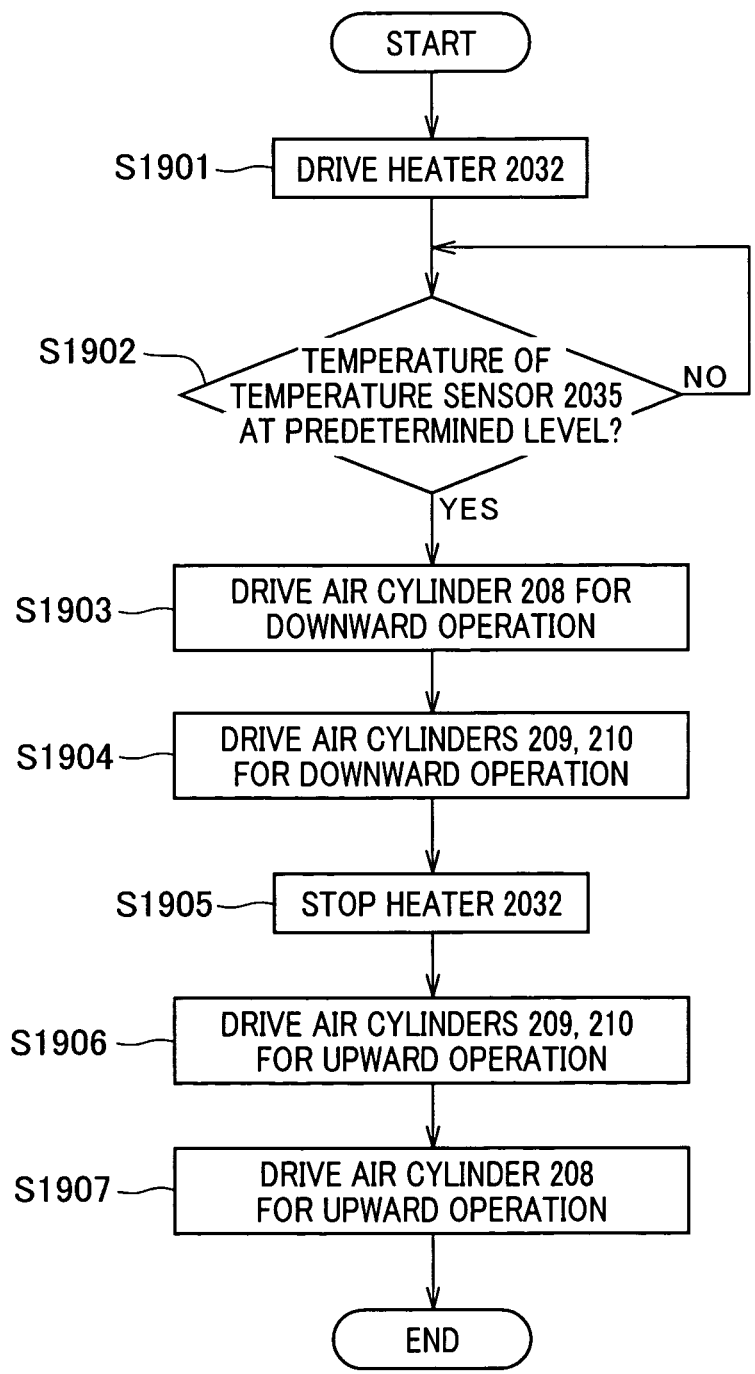
FIG. 19 is a flow diagram illustrating a process flow of the control executed by a control unit of the stator manufacturing apparatus illustrated in FIG. 13.

Referring to the flow diagram shown in FIG. 19 and the explanatory views of operating states shown in FIGS. 20, 21, 22 and 23, hereinafter is explained the operation of the stator manufacturing apparatus 200, i.e. the inserting (shrinkage fitting) steps taken for the assembly 50. It should be appreciated that, in FIGS. 20, 21, 22 and 23, indication of some of the components is omitted for the sake of viewability.

First, the operator may mount the assembly 50 and the outer cylinder 5 on the stator manufacturing apparatus 200 and operate the start switch 251 of the apparatus 200. Upon operation of the start switch 251 by the operator, the stator manufacturing apparatus 200 starts operation. In other words, being triggered by an input signal indicative of the operation of the start switch 251, the control unit 250 starts the processing shown in FIG. 19.

<<Heating Step>>

The control unit 250 drives the heater 2032, first, to start heating of the outer cylinder 5 (step S1901). After that, the control unit 250 monitors the temperatures detected by the temperature sensor 2035. If a detected temperature has not reached a predetermined value (e.g., 300° C.) ("No" at step S1902), the control unit 250 continues monitoring detected temperatures.

<<Inserting Step>>

Figure 20:
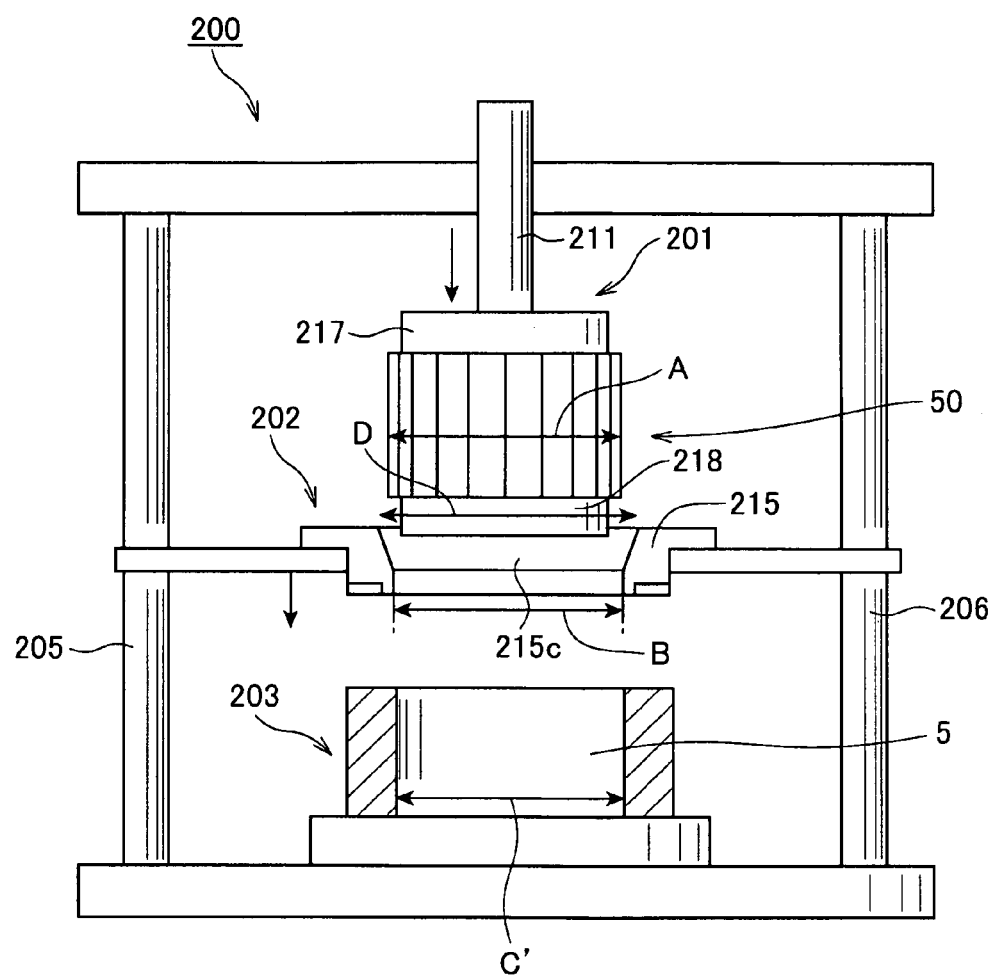
FIG. 20 is a schematic side view illustrating an operating state of the stator manufacturing apparatus illustrated in FIG. 13.

If a detected temperature has reached the predetermined value (e.g., 300° C.) ("Yes" at step S1902), the control unit 250 drives the air cylinder 208 for downward operation as shown in FIG. 20 (step S1903), and at the same time, drives the air cylinders 209, 210 for downward operation (step S1904). In this case, the outer cylinder 5 has been sufficiently heated to cause thermal expansion that turns the inner diameter of the outer cylinder to C'.

Figure 21:
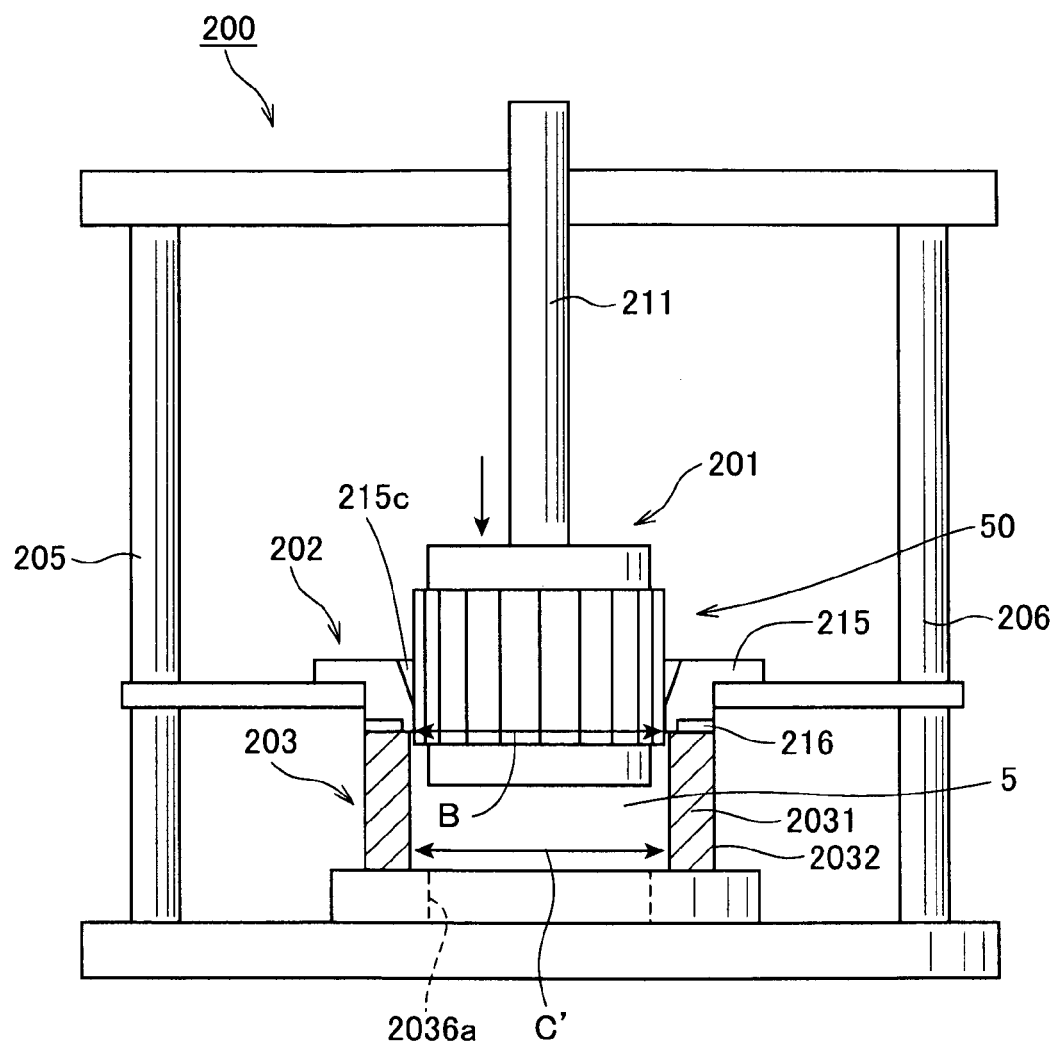
FIG. 21 is a schematic side view illustrating an operating state of the stator manufacturing apparatus illustrated in FIG. 13, following the state illustrated in FIG. 20.

After that, as shown in FIG. 21, the tapered guide unit 202 stops descending when its heat insulating member 216 comes into contact with the heating unit 203. Meanwhile, the support unit 201 mounted with the assembly 50 keeps descending to permit the assembly 50 to pass through the through hole 215c of the tapered guide unit 202. As a result, the diameter of the outer periphery of the assembly 50 is reduced to the inner diameter B of the small-diameter portion 215b, so that, as shown in FIG. 22, the assembly 50 is inserted into the outer cylinder 5.

In the present embodiment, heat insulation is applied to some portions. However, in order to reduce the influence on other portions caused by the heat emitted from the heating unit 203, it is better that the time is short from when the heat insulating member 216 comes into contact with the heating unit 203, up to when the insertion of the assembly 50 into the outer cylinder 5 is completed (the time taken for the transition from the state shown in FIG. 21 to the state shown in FIG. 22). For example, the transition may desirably be conducted in about one second.

<<Cooling Step>>

Figure 22:
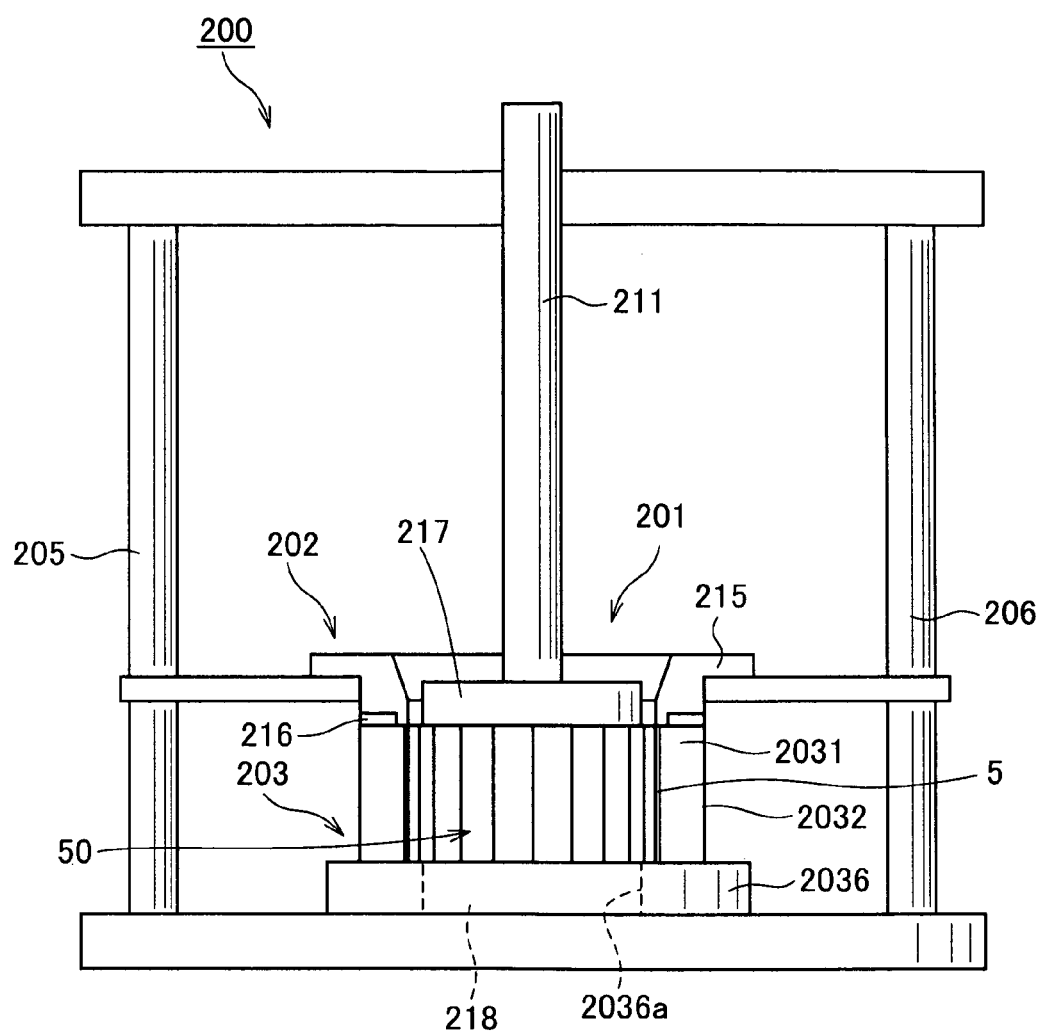
FIG. 22 is a schematic side view illustrating an operating state of the stator manufacturing apparatus illustrated in FIG. 13, following the state illustrated in FIG. 21.

After the state shown in FIG. 22, the heater 2032 is stopped (step S1905), and then cooled by a blower (not shown), for example, to reduce the inner diameter of the outer cylinder 5, while the air cylinders 209, 210 are driven upward (step S1906).

When the heater 2032 is cooled, the outer cylinder 5 is also cooled to reduce the inner diameter of the outer cylinder 5. Reaching the state where the assembly 50 will no longer detach from the outer cylinder 5, the air cylinder 208 is driven for upward operation (step S1907). By the time of the upward operation of the air cylinder 208, the assembly 50 has been shrink-fitted to the outer cylinder 5 to provide the stator 3. Thus, the stator 3 is lifted up with the upward operation of the air cylinder 208 (see FIG. 23).

Figure 23:
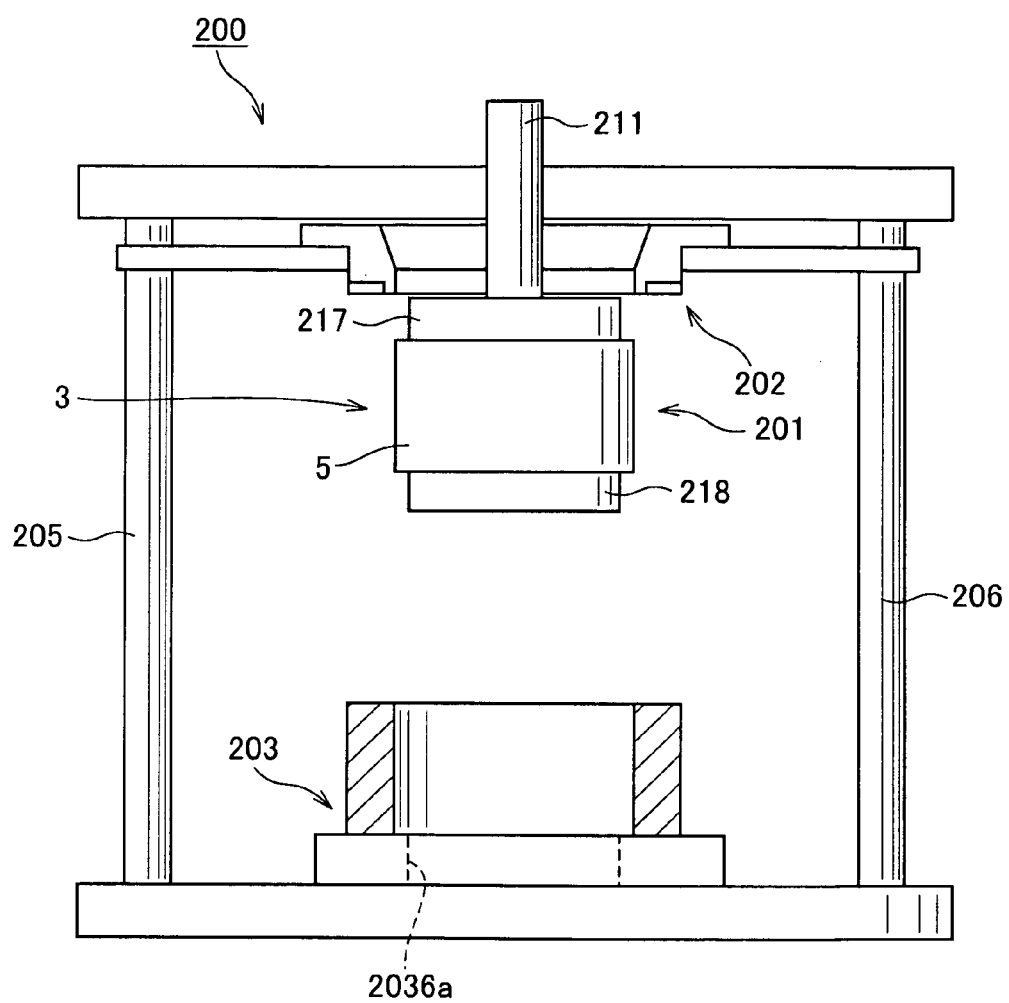
FIG. 23 is a schematic side view illustrating an operating state of the stator manufacturing apparatus illustrated in FIG. 13, following the state illustrated in FIG. 22.

Subsequently, the stator 3 is cooled down, in the state shown in FIG. 23, by means of a blower, for example, for about thirty minutes to complete the inserting (shrink-fitting) step.

According to the present invention described above, the driving unit is adapted to reduce the outer diameter of the stator core by permitting the stator core to pass on and along the taper of the through hole formed in the tapered guide unit. Thus, the size of the stator core can be radially reduced, with a uniform diameter being obtained throughout the stator core. As a result, a circularity of 0.05 mm or less, for example, can be achieved for the inner diameter of the stator core.

Further, the driving unit is adapted to insert the stator core into the outer cylinder while the diameter of the stator core is being reduced by permitting the stator core to pass on and along the taper of the through hole formed in the tapered guide unit. Thus, the radial reduction and the insertion into the outer cylinder (shrinkage fitting) can be achieved through a single step.

The present invention can be applied to rotary electric machines loaded on electric vehicles and hybrid vehicles. According to the present invention, the inner periphery of the stator core of such a rotary electric machine can be made proximate to a perfect circle. Such circularity is advantageous for reducing the size and enhancing the output of such a rotary electric machine.

What is claimed is:

1. A stator manufacturing method for manufacturing a stator for a rotary electric machine, the stator having a stator core including an outer cylinder with a cylindrical through bore formed through an axial direction of the outer cylinder and a core assembly shrink-fit in the through bore of the outer cylinder, the core assembly being equipped with segment cores wound by coils, the method including:

a step of providing a guide unit operatively associated with the stator core and comprising a large-diameter portion having a bore defined by a diameter larger than an outer diameter of the core assembly, and a small-diameter portion having an end serving as the one end of the guide unit and a bore defined by a diameter i) larger than the inner diameter of the outer cylinder given when the outer cylinder is not heated in the heating step, ii) smaller than the inner diameter of the outer cylinder given when the outer cylinder is heated in the heating step, and iii)

smaller than the outer diameter of the coil assembly, wherein both bores of the large-diameter and small-diameter portions are connected via a tapered through hole to be in line in a direction along the tapered through hole, the tapered through hole being shaped by a tapered surface connecting both surfaces respectively shaping both of the bores of the large-diameter and small-diameter portion;

a step of heating the outer cylinder to a predetermined temperature so that the outer cylinder is thermally expanded to increase an inner diameter of the outer cylinder;

a step of locating the guide unit such that one end of the guide unit is adjacent to the outer cylinder and both of the guide unit and the outer cylinder are in line with each other in the axial direction, after the temperature of outer cylinder reaches the predetermined temperature in the heating step;

a step of forcibly inserting the core assembly through the guide unit and then inserting the core assembly into the outer cylinder in a state where the outer cylinder has been heated to the predetermined temperature in the heating step; and a first step of cooling the outer cylinder to reduce the diameter thereof, immediately after the inserting step is completed.

2. The method of claim 1, further comprising a step of moving the stator core in which the core assembly is shrink-fit in the cylindrical through bore of the outer cylinder, after completion of cooling in the first cooling step; and a second step of further cooling the entire stator core after the moving step.

* * * * *